United States Patent [19]
Frank et al.

[11] Patent Number: 6,068,486
[45] Date of Patent: May 30, 2000

[54] MULTIDISPLAY GLOBE WITH OVERLAYS

[76] Inventors: Marjorie Frank, 18 Verandah Pl., Brooklyn, N.Y. 11201; Morissa Geller, 12 Cambridge Pl., Brooklyn, N.Y. 11238

[21] Appl. No.: 09/221,085

[22] Filed: Dec. 24, 1998

[51] Int. Cl.[7] .................................................. G09B 27/08
[52] U.S. Cl. .......................... 434/135; 434/130; 434/134
[58] Field of Search ..................................... 434/134, 135, 434/137, 147, 287, 288, 130; 273/157 A

[56] References Cited

U.S. PATENT DOCUMENTS

| | | | |
|---|---|---|---|
| 2,402,194 | 6/1946 | Wolfe | 434/287 |
| 3,016,629 | 1/1962 | Case | 434/147 |
| 3,037,300 | 5/1962 | Grosser | 434/147 |
| 3,046,677 | 7/1962 | Patella | 434/288 |
| 3,303,582 | 2/1967 | Farquhar | 434/288 |
| 3,618,955 | 11/1971 | Barnes . | |
| 3,851,884 | 12/1974 | Myller . | |
| 3,865,382 | 2/1975 | Myller . | |
| 4,083,122 | 4/1978 | Denney | 434/137 |
| 4,115,930 | 9/1978 | Beck | 434/131 |
| 4,334,867 | 6/1982 | Friedman | 434/145 |
| 4,494,935 | 1/1985 | Miller . | |
| 4,595,367 | 6/1986 | Forsyth . | |
| 4,797,102 | 1/1989 | Forsyth | 434/147 |
| 4,937,181 | 6/1990 | Rogers . | |
| 5,033,965 | 7/1991 | Chiu | 434/131 |
| 5,080,591 | 1/1992 | Forsyth . | |
| 5,217,226 | 6/1993 | Christopher | 273/157 R |
| 5,441,261 | 8/1995 | Margolis | 273/157 R |
| 5,549,332 | 8/1996 | Judson | 283/34 |

FOREIGN PATENT DOCUMENTS

| | | | |
|---|---|---|---|
| 89/06036 | 5/1989 | France . | |
| 1132367 | 6/1962 | Germany | 434/147 |
| 2 231 808 | 5/1990 | United Kingdom . | |
| 2235805 | 3/1991 | United Kingdom | 434/147 |

*Primary Examiner*—Robert A. Hafer
*Assistant Examiner*—Kurt Fernstrom
*Attorney, Agent, or Firm*—Lackenbach Siegel Marzullo Aronson & Greenspan, P.C.

[57] ABSTRACT

A multidisplay globe comprising a globular body including a globe spherical surface representing the earth, support means for mounting the globular body, and spherical film overlays removably mounted over the globe spherical surface for displaying selected features related to the earth. Each film overlay is preferably in two units comprising the northern and southern hemispheres of the earth. The spherical film overlays include one, two or more transparent film overlays each of which has a spherical surface one of which is removably mounted over the spherical earth surface and in turn each further film overlay is further removably mounted one over the other. The selected features related to the earth spherical surface are imprinted on the spherical surfaces of each of the film overlays. The film overlays are transparent, flexible, stretchable, and biasable so that one film overlay can be mounted over another film over and when each film overlay is removed from the mounted position it will return to the original flexible configuration and can be folded and stored in a small space. Selected rigid overlays can optionally be used. Flexible and opaque overlays of the planets of the solar system including the moon of the earth can optionally be provided for mounting onto a blank globular body.

16 Claims, 21 Drawing Sheets ns 6,068,486

MULTIDISPLAY GLOBE WITH OVERLAYS

FIELD OF THE INVENTION

The present invention relates generally to the field of display globes of the earth and the planets.

BACKGROUND OF THE INVENTION

The many display globes of the earth currently marketed for school or home use share one limitation: Globes display political, social, scientific and other types of information that are made obsolete through developments over time. Although many display globes are sold to schools and the public, the buyers fully realize that many of the detailed features and much of the data imprinted on the globes will sooner or later be outmoded.

Display globe manufacturers therefore are forced to produce two completely different types of globes so as to present as wide a choice to the public as possible. One type is a globe with only the most basic information that is unlikely to change over the immediate future. The second type is a globe displaying a wide display of political and social data even though that information is anticipated to be obsolete in the near future. Many potential buyers decide not to invest in a globe that does not meet their desire to own a product that is both sophisticated in presentation of data and is also viable over the long term.

In addition to this fundamental problem of display globe manufacturers, historical buying patterns plus long-standing tradition limit the content of most globes to topographic and/or political information. Special interest contents, such as rainfall, climate, vegetation and population, are generally presented in a planar map context and are virtually unrepresented in a globular format, even though a globe is clearly the most accurate medium to display such information.

The described static nature of globes as product and the infrequency of repeat purchases of globes by the public based upon cost of product have limited globe manufacturers to offering a narrow range of product selections.

SUMMARY OF THE INVENTION

In accordance with these and other objects that will become apparent in the course of this disclosure, there is provided a multidisplay globe comprising a globular body including a globe spherical surface representing the earth, support means for mounting the globular body, and spherical film overlays removably mounted over the globe spherical surface for displaying selected features related to the earth. Each film overlay is preferably in two units comprising the northern and southern hemispheres of the earth. The spherical film overlays include one, two or more transparent film overlays each of which has a spherical surface one of which is removably mounted over the spherical earth surface and in turn each further film overlay is further removably mounted one over the other. The selected features related to the earth spherical surface are imprinted on the spherical surfaces of each of the film overlays. The film overlays are transparent, flexible, stretchable, and biasable so that one film overlay can be mounted over another film over and when each film overlay is removed from the mounted position it will return to the original flexible configuration and can be folded and stored in a small space. Selected rigid overlays can optionally be used. Flexible and opaque overlays of the planets of the solar system including the moon of the earth can optionally be provided for mounting onto a blank globular body.

The following domestic and foreign patents relate generally to instructional globular and planar geographic surfaces that can be varied in the course of instruction of of generaly display. Such patents are as follows: U.S. Pat. No. 4,937,181 issued to Rogers on Jun. 26, 1990; U.S. Pat. No. 4,595,367 issued to Forsyth on Jun. 17, 1986; U.S. Pat. No. 4,494,935 issued to Miller on Jan. 22, 1985; U.S. Pat. No. 4,115,930 issued to Back on Sep. 26, 1978; U.S. Pat. No. 3,865,382 issued to Myller on Feb. 11, 1975; U.S. Pat. No. 3,851,884 issued to Myller on Dec. 3, 1974; U.S. Pat. No. 5,441.261 issued to Margolis et al. on Aug. 15, 1995; U.S. Pat. No. 5,080,591 issued to Forsyth on Jan. 14, 1992; UK Patent Application 2 31 808 A issued to Hassall on Nov. 28, 1990; and French Patent No. 2 646 889-Al issued to Raba on May 9, 1989. None describe a globe with film overlays.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

DESCRIPTION OF THE PREFERRED EMBODIMENT

Reference is now made in detail to the drawings wherein the same numerals refer to the same or similar elements throughout.

Figure 1:
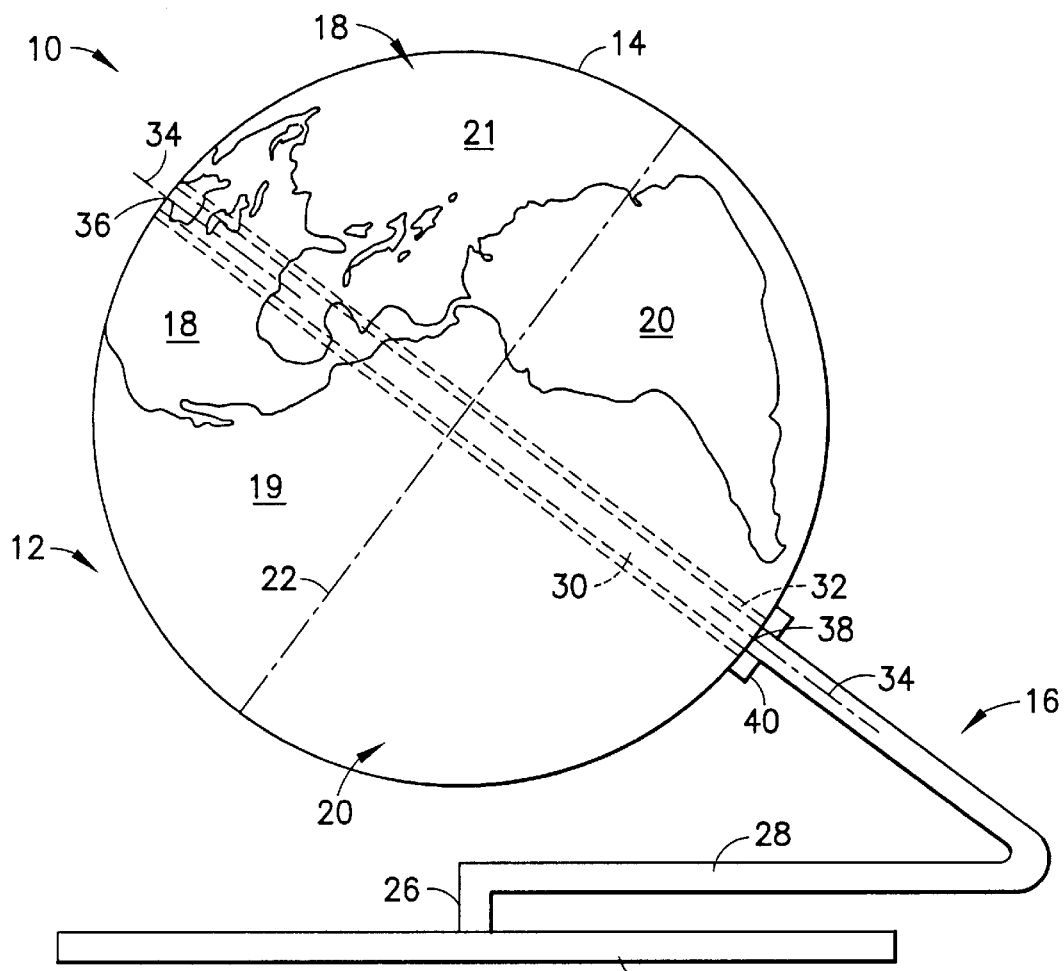
FIG. 1 shows an elevational view of a display globe mounted on a support with a perspective view of a globular body of the earth taken perpendicular to the equatorial plane of the earth with land formations of the earth imprinted on the spherical surface with the western hemisphere in view to the viewer.

A display globe 10 shown in FIG. 1 includes a globular body 12 including a globe spherical surface 14 and a support structure 16 that mounts globular body 12. Globular body 12 is made of a hard plastic material that can be opaque or transparent. Globe spherical surface 14 has imprinted thereon the basic land formations of the earth represented in FIG. 1 by the basic land masses of the western hemisphere including the northern and southern hemispheres 18 and 20, respectively. In particular, North America 18A, the Pacific Ocean 19, South America 20A and the Atlantic Ocean 21 are generally indicated for purposes of exposition along with other land masses that are shown but not identified. The perspective selected herein in FIG. 1 for purposes of exposition is perpendicular to the plane of the earth defined by the equator 22. It is to be understood that the land formations of the eastern hemisphere although not particularly shown are likewise imprinted on the opposite side of globe spherical surface 14 shown in FIG. 1.

Support structure 16 includes a base 24, a vertical post 26 secured to base 24, a horizontal support rod 28 connected at one end to the top of vertical post 26 and integral at the other end of vertical post 26 to a tilted shaft 30 that is slidably and rotatably positioned within a hollow, cylindrical shaftway 32 that is positioned within globular body 12. Shaft 30 when positioned within shaftway 32 is coextensive with the axis 34 of the earth that extends between north and south poles 36 and 38, respectively. Shaftway 32 is unitary with and is internally affixed to globular body 12 and axially extends through globular body 12. The lower end of shaftway 32 is aligned with south pole 38 of globular body 12 and in the mounted position rests upon a circular flange 40 unitary with shaft 30. Flange 40 in turn supports the entire globular body 12 in its mounted and angular disposition which gravitationally presses upon flange 40. Globular body 12 is rotatably mounted onto shaft 30 by way of shaftway 32 and is axially removable from support structure 16 by being slid upwardly from shaft 30, and furthermore in a similar manner is axially slidably mountable to shaft 30. The upward angle of shaft 30 relative to the horizontal allows for greater viewing of the earth as globular body 12 is rotated around shaft 30. The angle of shaft 30 relative to the horizontal can vary.

Figure 2:
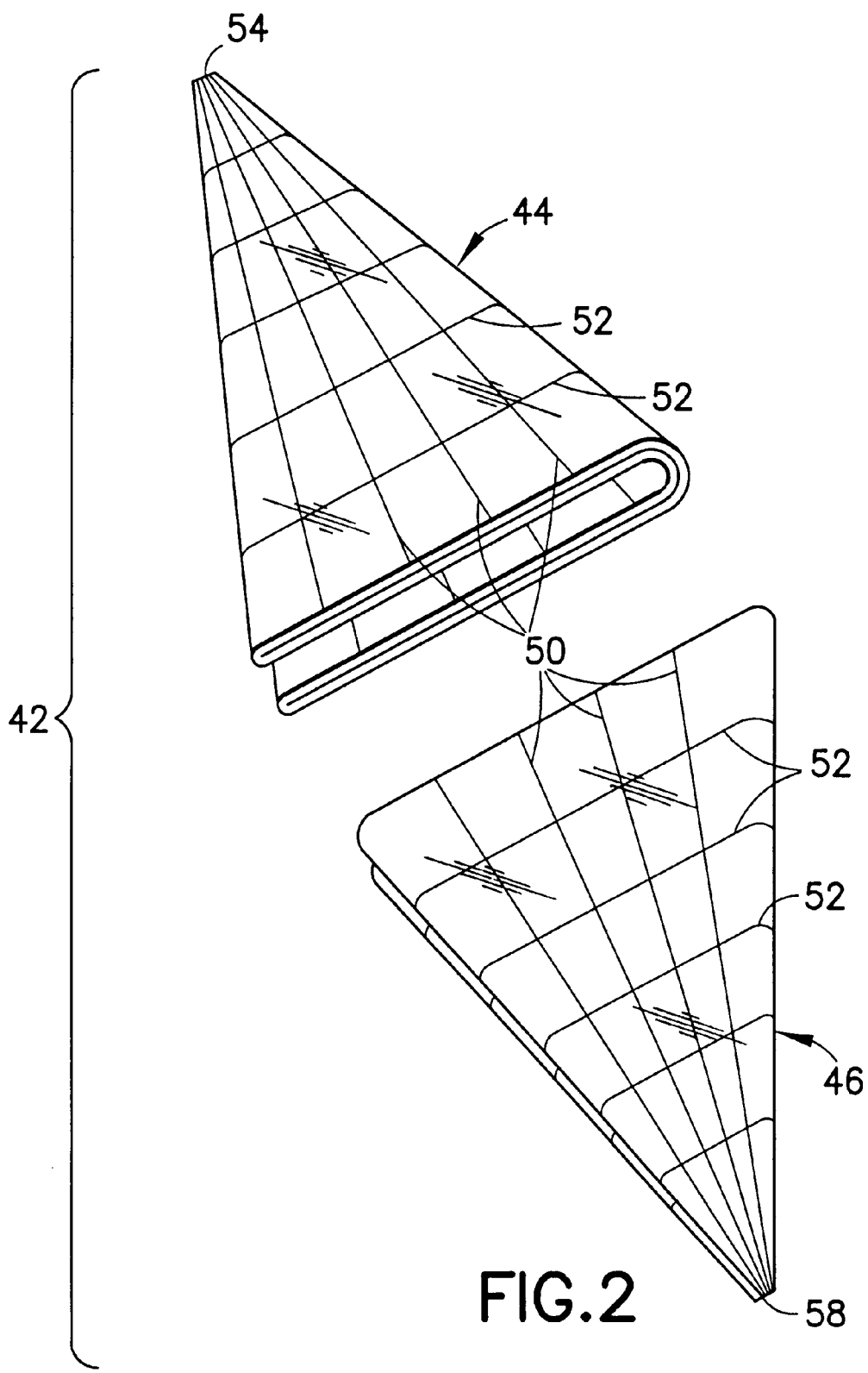
FIG. 2 is a perspective view of a flexible and foldable transparent film overlay comprising the northern and southern hemispheres of the earth in folded positions imprinted with the latitudes and longitudes of the earth for fitting over the globular body of the earth shown in FIG. 1.

A first transparent flexible film overlay 42 is shown in a stored folded mode in FIG. 2. First film overlay comprises two hemispheres, namely, a northern hemisphere film overlay 44 and a southern hemisphere film overlay 46 each folded separately.

Figure 3:
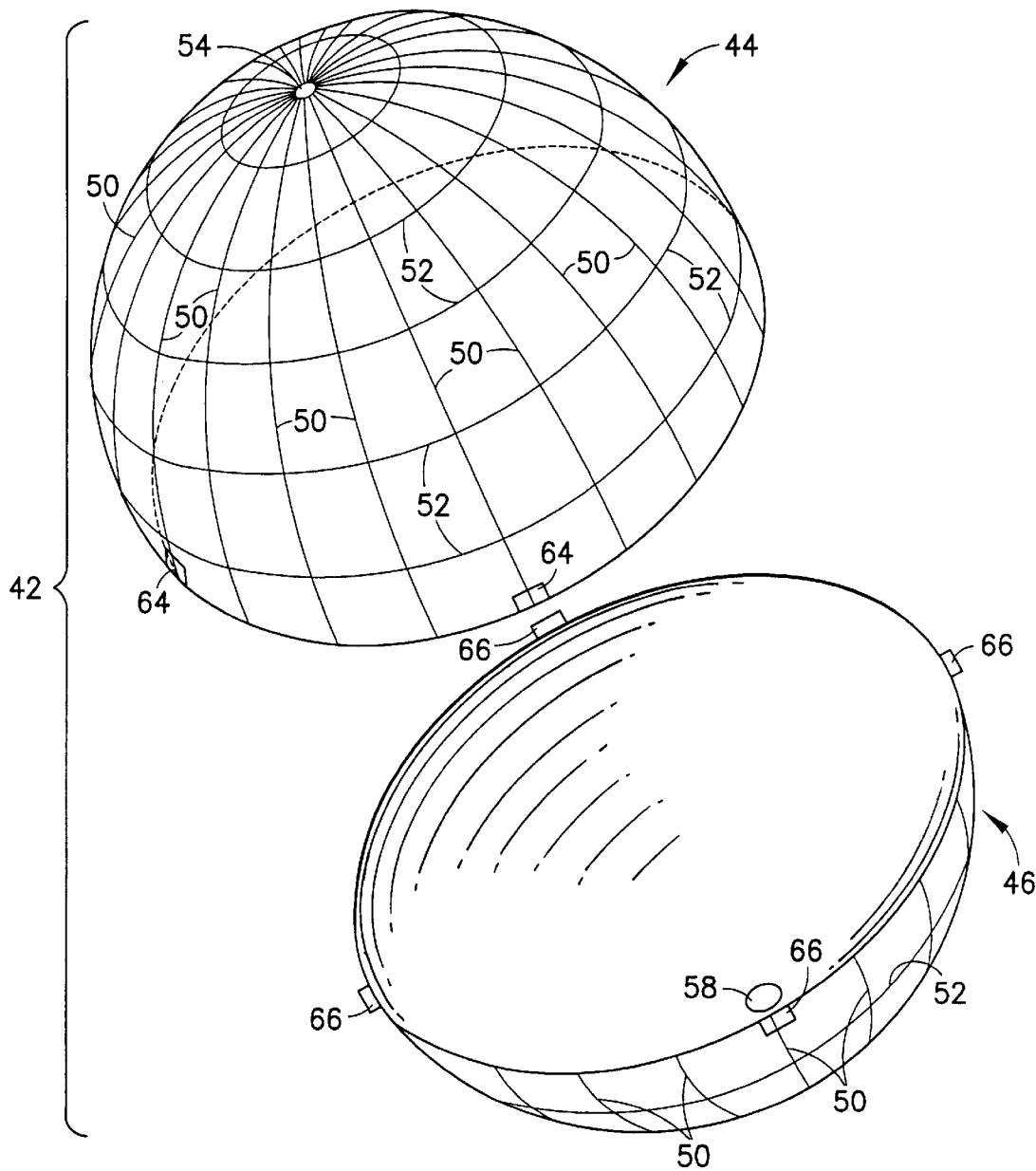
FIG. 3 is a perspective view of the northern and southern hemisphere film overlays shown in FIG. 2 opened into hemispherical configurations in preparation for fitting over the globular body of the earth shown in FIG. 1.

In FIG. 3 first film overlay 42 is shown with northern hemisphere film overlay 44 extended into a hemispherical configuration and likewise with southern hemisphere film overlay 46 extended into a hemispherical configuration.

First film overlay 42 has a mounted spherical dimension that allows a snug fit in the mounted position over globular body 12 and further has an unmounted position of having been removed from globe spherical surface 14. First film overlay 42 as comprising northern hemisphere film overlay 44 and southern hemisphere film overlay 46 is made of a material that is both flexible and foldable, and further that has the memory to be re-extended from the unmounted position in the folded mode to the spherical mode, that is, to the dual hemispherical modes, thus maintaining first spherical surface 48 for the mounted mode.

Figure 4:
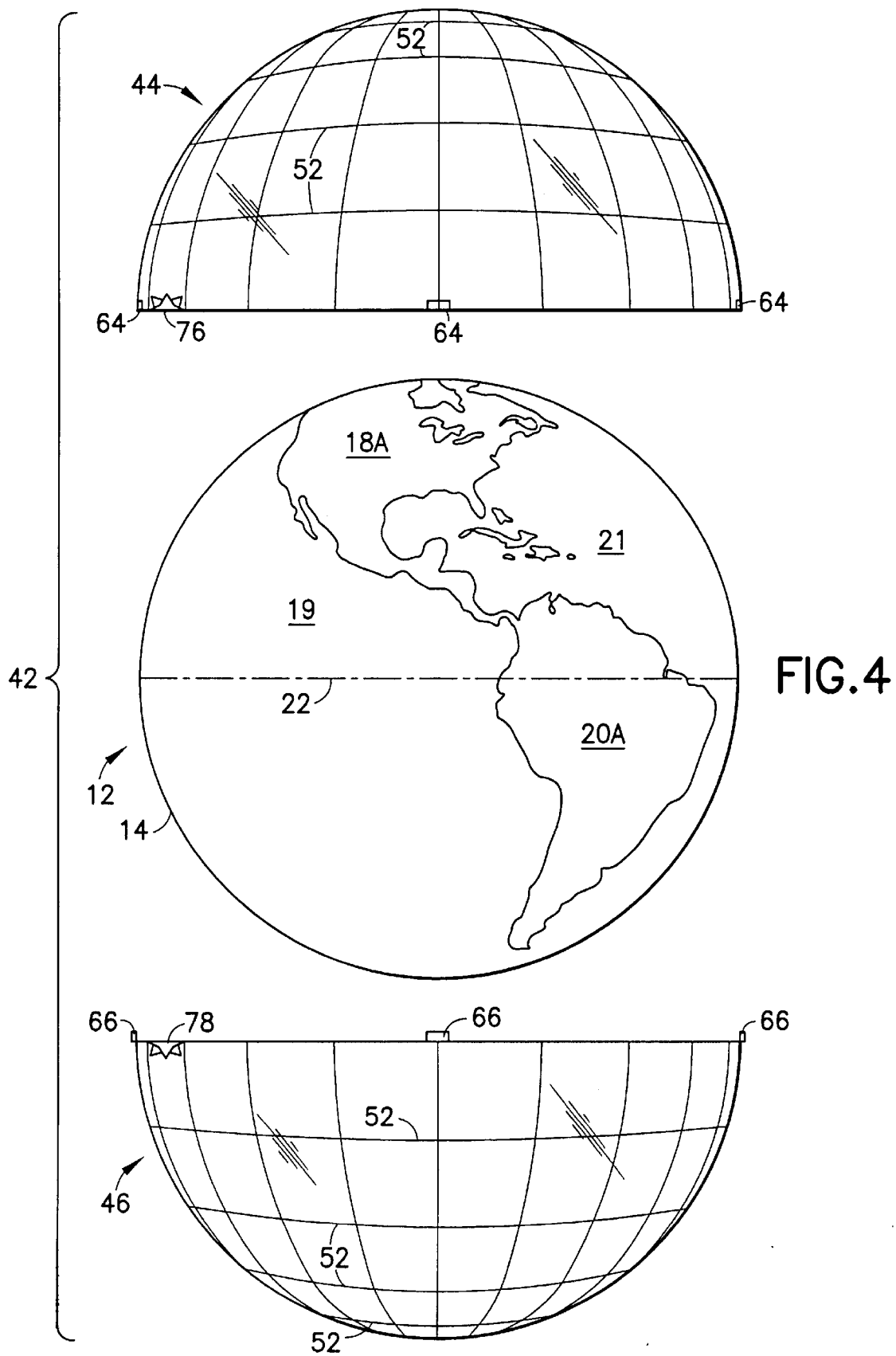
FIG. 4 is a perspective view of the globular body of the earth of FIG. 1 taken through the plane of the equator with each of the hemispherical film overlays shown in FIG. 3 in position for mounting over the globular body of FIG. 1.

In FIG. 4 northern hemisphere film overlay 44 is shown positioned for mounting over northern hemisphere 18 of globular body 12 and southern hemisphere film overlay 46 is shown positioned for mounting over southern hemisphere 20 of globular body 12. First spherical surface 48 of first film overlay 42 has imprinted thereon a first feature related to the earth, namely, nine parallel lines of latitude 50 at 36 degrees and twenty-four longitudinal meridians 52 at 15 degree intervals.

Figure 5:
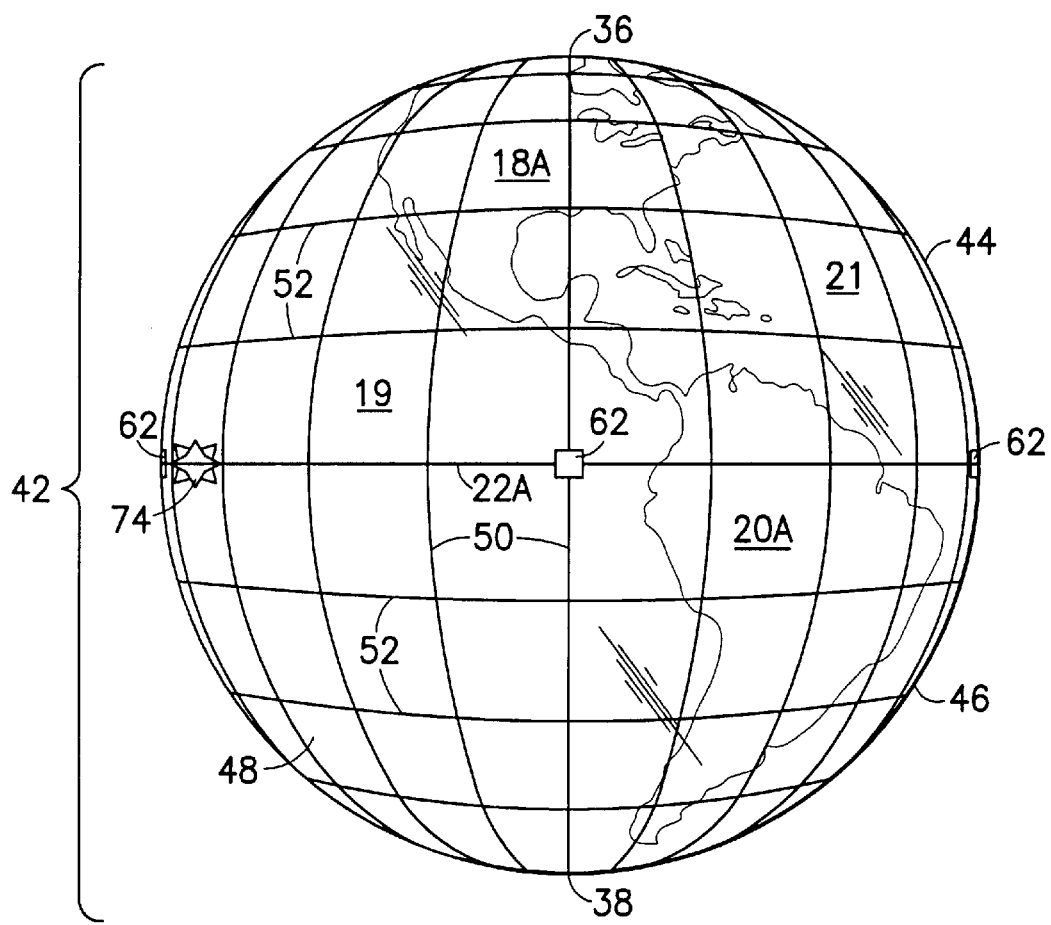
FIG. 5 is a perspective view of the northern and southern film overlays of FIG. 4 mounted over the globular body of the earth taken through the plane of the equator of the earth.
Figure 6:
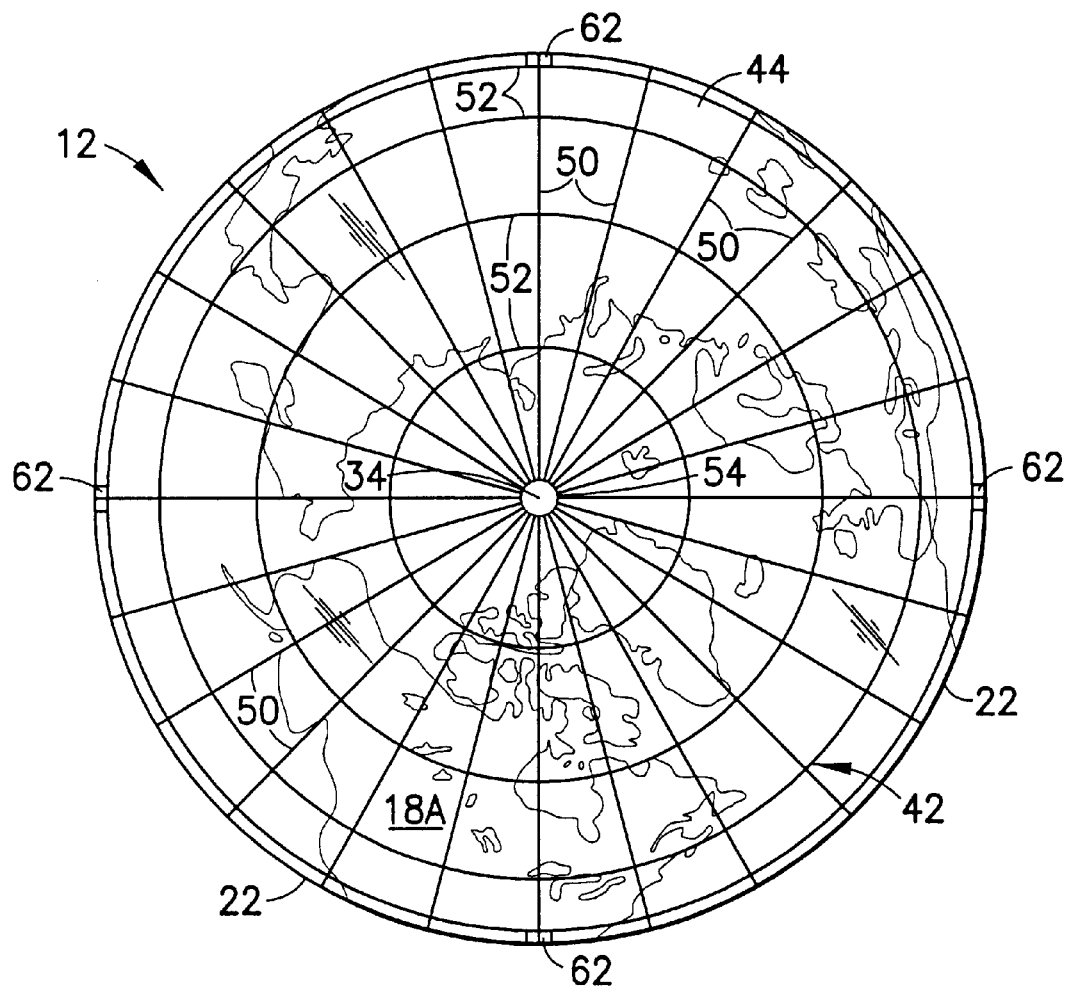
FIG. 6 is a north pole perspective view of the globular body of the earth with the film overlay shown in FIG. 5.

Latitudes 50 and longitudes 52 are shown by way of exposition as representing any of a wide range of selected features related to globular body 12 imprinted upon a plurality of spherical film overlays. Such selected features could include but are not be limited to the following by way of example:

Animal range and Habitat
  by group
  by species
  Endangered Species
Animal Migration
  by group
  by species
Topographical Features
  Altitude
  Vegetation
  Rainfall/Precipitation
  Climate
Worldwide Reserves
  oil
  natural gas
  forest land
  selected minerals, e.g.
    diamonds
    gold
    bauxite
    iron
Prevailing Winds
Ocean Currents
Countries and Capitals-current
Countries and Capitals-historical, e.g.
  during colonization
  American Revolution
  Civil War
  World War I/II
  Cold War
  Roman empire, by epoch
  Egyptian Empire, by epoch
Transportation Routes, e.g.
  air, including polar
  sea
Heavenly Bodies
  planets
  earth's moon
  stars
  lines showing constellations
Population
  current
  historical by century
  by race
  by average life span
  by education
  by language
  by religion
  by income
Forms of Government
Trading Partners
Exports
  by selected goods
  by selected countries
Imports
  by selected goods
  by selected countries
Earth's Prehistory
  tectonic plates-pangea
  dinosaurs/fossils finds
  ice age
    selected animals
    climate
World Consumption
  selected goods per capita, e.g.
    oil
    foods, e.g.
      sugar
      coffee
      meat
    (non)luxury items, e.g.
      automobiles
      computers
      (cellular) telephones
      televisions
  selected services per capita, e.g.
    physicians
    attorneys
    government employees
Meteorological Patterns
  hurricane/tornado regions After first film overlay 42 has been fully and snugly positioned over globular body 12, both globular body 12 with first film overlay 42 is mounted to support structure 16 by axially sliding shaftway 32 around shaft 30. FIGS. 5 and 6 illustrate first film overlay 42 fully mounted over globular body 12. As shown in FIGS. 2 and 3, a circular aperture 54 is defined in first film overlay 42 at axis 34 at north polar area 56 and a circular aperture 58 is defined in first film overlay 42 at axis 34 at south polar area 60. Circular aperture 54 is optional and can be eliminated. Optional north polar area circular aperture 58 is also shown in FIG. 6.

Figure 7:
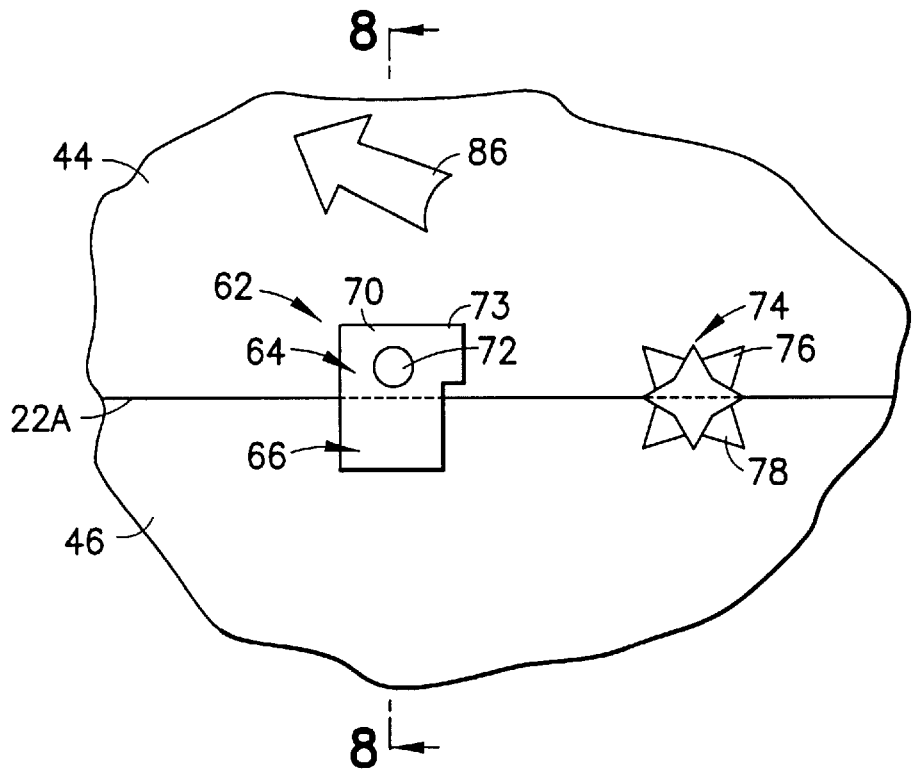
FIG. 7 is a top view taken in isolation of one of the snap-on connectors securing the northern and southern hemisphere film overlays shown in FIG. 5 along with a positional marker and an alignment compass rose.
Figures 8, 8A:
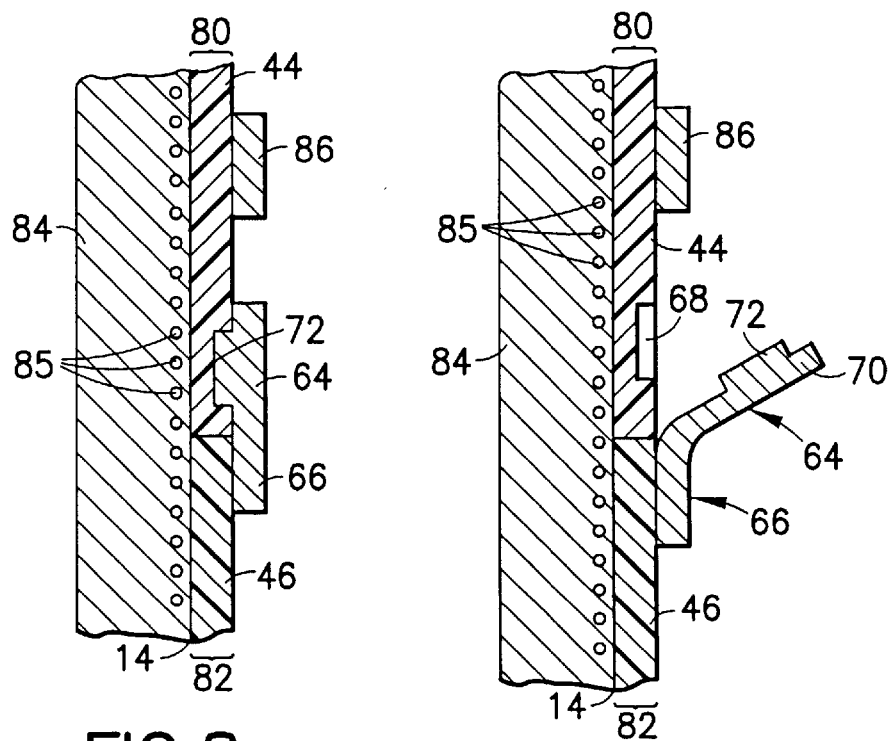
FIG. 8 is a sectional view taken through line 8—8 of FIG. 7 showing the snap-on connector is a closed mode and further showing iron particles embedded in the undersurface of the globular body.
FIG. 8A is a sectional view analogous to the view of FIG. 8 further showing the snap-on connector of FIGS. 7 and 8 in an open mode.

Southern hemisphere film overlay 46 is removably secured to northern hemisphere film overlay 44 by four snap-on connectors 62 spaced at 90 degree intervals positioned around equator 22A as shown in FIGS. 4 and 5. As shown in detail in FIGS. 7, 8, and 8A, each snap-on connector 62 comprises an upper connector 64 integral with northern hemisphere film overlay 44 and a lower connector 66 nonremovably connected to southern hemisphere film overlay 46. As shown in FIGS. 7, 8, and 8A, each upper connector 64 defines a cylindrical receptacle 68 and each lower connector 66 includes an upper flap 70 rotatably connected to southern hemisphere film overlay 46. Each upper flap 70 includes a cylindrical button 72 that is shown in FIGS. 7 and 8 snap-mounted into each receptacle 68 in a manner known in the art. Each upper flap 70 includes a short side flap grip 73 that is hand grippable for removing button 72 from receptacle 68. When all four snap-on connectors 62 are connected, northern and southern hemisphere film overlays 44 and 46 are secured one to the other and in addition are aligned in geographical relationship one to the other.

Snap-on connectors 62 can be optionally positioned at other circular alignments, for example, at 45 degree or 30 degree intervals. FIG. 8A shows snap-in button 72 removed from receptacle 68 thus releasing northern and southern hemisphere film overlays 44 and 46.

An alignment mark at equator 22A, shown in FIG. 7 as compass rose 74, is optionally imprinted onto northern and southern hemispheres 44 and 46 with upper one-half 76 of compass rose 74 imprinted on northern hemisphere film overlay 44 at equator 22A and a matching lower one-half 78 of compass rose 74 imprinted on southern film overlay 46 at equator 22A.

As shown in FIGS. 8 and 8A, northern hemisphere and southern hemisphere film overlays 44 and 46 have film overlay thicknesses 80 and 82, respectively, of approximately 3 to 5 millimeters, that overlie globular body 12 which has a rigid globular wall 84 that includes globe spherical surface 14. Embedded within rigid globular wall 84 are iron particles 85. A magnetic marker 86 shown held in position by iron particles 85 is movable for positioning at any location on northern and southern hemisphere film overlays 44 and 46.

Figure 9:
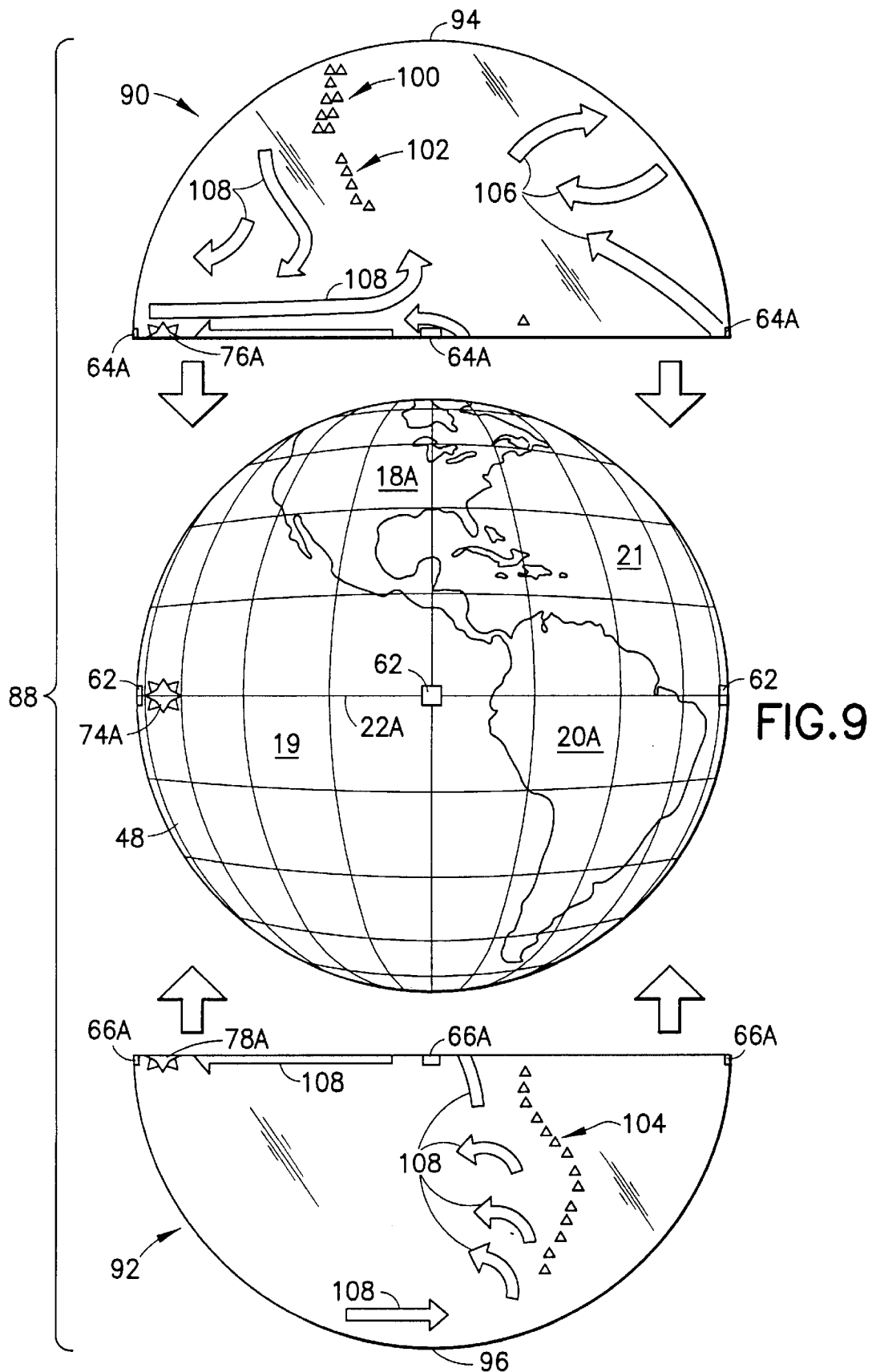
FIG. 9 is a perspective view taken through the equatorial plane of the globular body of the earth and the first film overlay shown in FIG. 5 with a second film overlay comprising the northern and southern hemispheres with topographic and ocean current features imprinted thereon in position for mounting.

FIG. 9 shows globular body 12 along with first film overlay 42 having been removed from support structure 16 by sliding shaftway 32 upwards along shaft 30. A second transparent spherical film overlay 88 is positioned for being slidably mounted over both globular body 12 and first film overlay 42. Second film overlay 88 is structured the same as first film overlay 42 in that it comprises two hemispheres, namely, a northern hemisphere film overlay 90 and a southern hemisphere film overlay 92. In particular northern hemisphere film overlay 90 is shown positioned for mounting over northern hemisphere 18 of globular body 12 and northern hemisphere film overlay 44 of first film overlay 42 and southern hemisphere film overlay 92 is shown positioned for mounting over southern hemisphere 20 of globular body 12 and southern hemisphere film overlay 46 of first film overlay 42.

Figure 10:
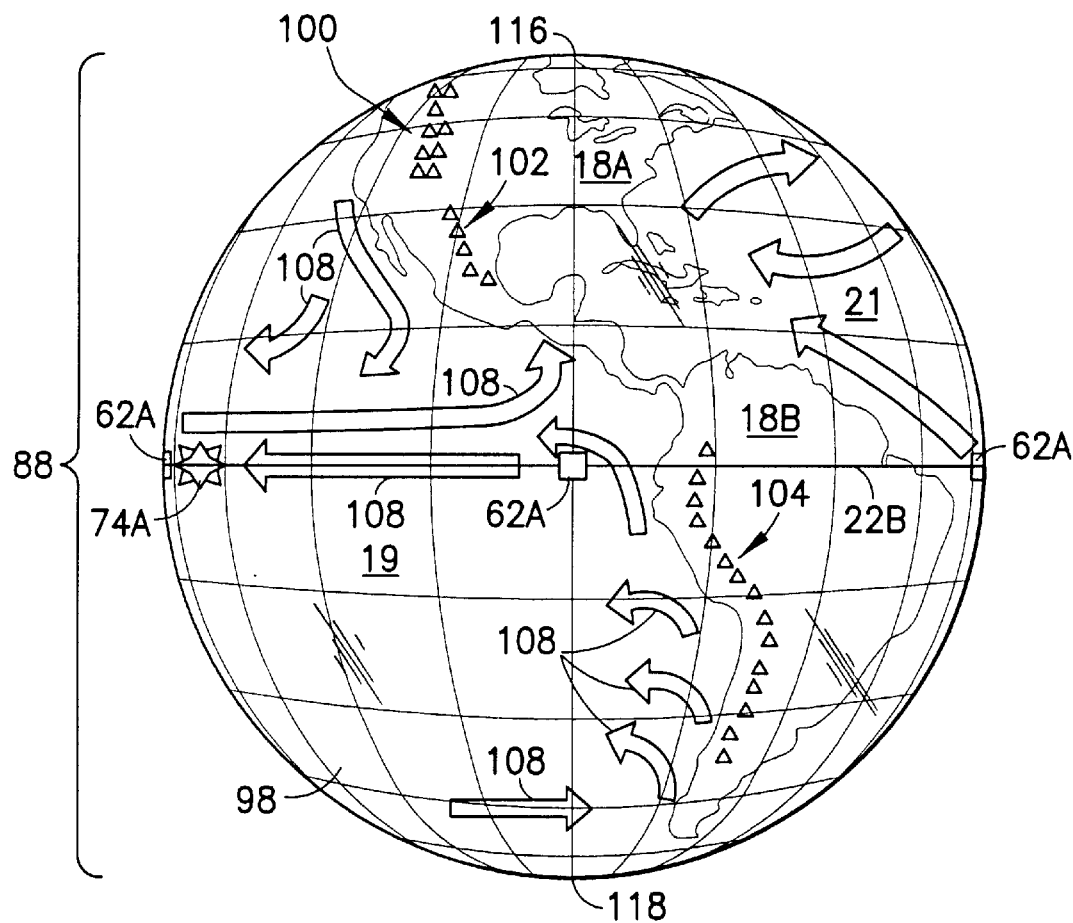
FIG. 10 is a perspective view taken through the plane of the equator of the earth with the second film overlay of FIG. 9 having been mounted over both the globular body of the earth and the first film overlay.

FIG. 10 shows second film overlay 88 fully positioned over globular body 12 and first film overlay 42. Globular body 12 with first film overlay 42 and second film overlay 88 can be mounted onto support structure 16 by axially sliding shaftway 32 onto shaft 30. As indicated in FIG. 9, an optional circular aperture 94 is defined in second film overlay 88 at axis 34 at north polar area 56 and another circular aperture 96 is defined in second film overlay 88 at axis 34 at south polar area 60. Second film overlay includes a second spherical surface 98 that has imprinted thereon another feature related to the earth, namely, a selected geographical feature herein being the mountain ranges of North America and South America shown without being particularly designated but known as the Rocky Mountains of North America indicated as 100, the Sierra Madre Occidental mountain range of Mexico indicated as 102, and the Andes mountain system of South America indicated as 104. Other major mountain ranges of the eastern hemisphere out of the view shown in FIG. 10 would likewise be imprinted on second spherical surface 98. A second feature imprinted on second spherical surface 98 is ocean currents particularly shown as Atlantic Ocean currents 106 and Pacific Ocean currents 108. Although not particularly shown, it is to be understood that the other major ocean currents of the earth of the eastern hemisphere out of the view shown in FIG. 10 would also be imprinted on second spherical surface 98.

Second film overlay 88 comprising northern and southern hemisphere film overlays 90 and 92 is flexible so as to allow folding in the same manner as first film overlay 42 in FIG. 2 with a memory to re acquire a spherical configuration without folding creases when again placed in said successive mounted position. In addition, second film overlay 88 is biasable so as to allow stretching over first film overlay 42 and having a biased overlay mounted position of being fit snugly over first film overlay 42 and having an unbiased unmounted position removed from first film overlay 42.

Second film overlay 88 can be directly mounted over globular body 12 in which case its biasable characteristic is not exercised. First film overlay 42 can in such a case be stretched over second film overlay 88. First film overlay 42 is biasable in the same way as second film overlay 88 having in such a case a biased overlay mounted position of being snugly fit over second film overlay 88 and having an unbiased unmounted position removed from second film overlay 88. Thus both first and second film overlays 42 and 88 are biasable with the biasability being exercised when successively mounted one over the other.

As shown in FIG. 9, four snap-on connectors 62A comprising upper and lower connector portions 64A and 66A secured to northern and southern hemisphere film overlays 90 and 92, respectively, connect northern and southern hemisphere film overlays 90 and 92 at 90 degree intervals around equator 22B. Snap-on connectors 62A comprising upper and lower connectors 64A and 66A, respectively, are analogous to snap-on connectors 62 comprising upper and lower connectors 64 and 66 of first film overlay 42. Northern and southern film overlays 90 and 92 are placed into alignment at equator 22B by snap-on connectors 62A and by an optional compass rose 74A shown in FIG. 10 comprising upper and lower halves 76A and 78A of compass rose 74A shown in FIG. 9.

Figure 11:
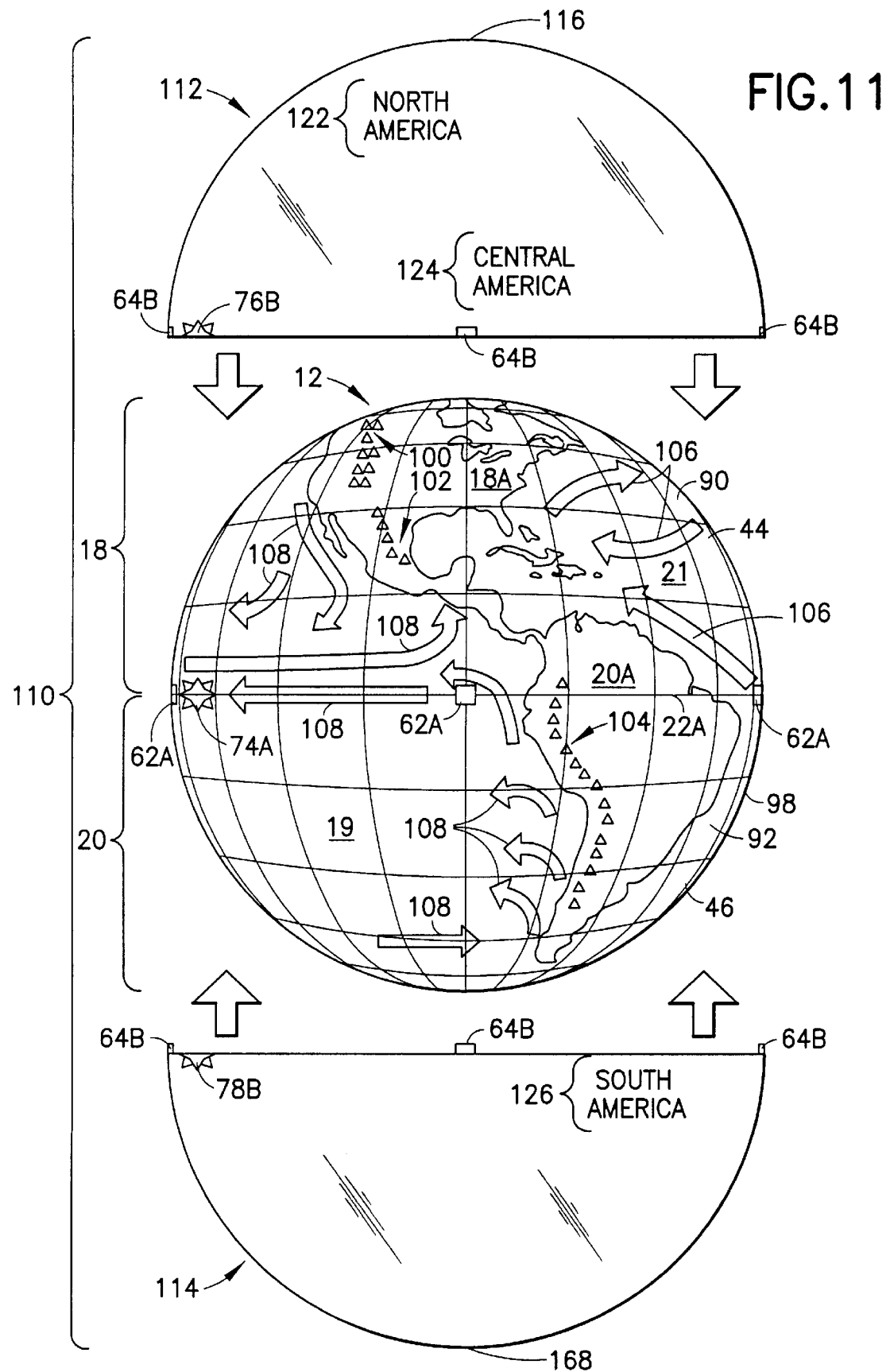
FIG. 11 is a perspective view taken through the equatorial plane of the globular body of the earth and the first and second film overlays as shown in FIG. 10 with a third film overlay comprising the northern and southern hemispheres with indicia of regional identification imprinted thereon in position for mounting.

FIG. 11 shows globular body 12 along with first film overlay 42 together with second film overlay 88 having been removed from support structure 16 by sliding shaftway 32 upwards from shaft 30. A third transparent spherical film overlay 110 is positioned for being slidably mounted over both globular body 12 and first and second film overlays 42 and 88. Third film overlay 110 is structured the same as first film overlay 42 and second film overlay 88 in that it comprises two hemispheres, namely, a northern hemisphere overlay film 112 and a southern hemisphere film overlay 114. In particular northern hemisphere overlay film 112 is shown positioned for mounting over northern hemisphere 18 of globular body 12, northern hemisphere film overlay 44 of first film overlay 42, and northern hemisphere film overlay 90 of second film overlay 88; and southern hemisphere film overlay 114 is shown positioned for mounting over southern hemisphere 20 of globular body 12, southern hemisphere film overlay 46 of first film overlay 42, and southern hemisphere film overlay 92 of second film overlay 88.

Figure 12:
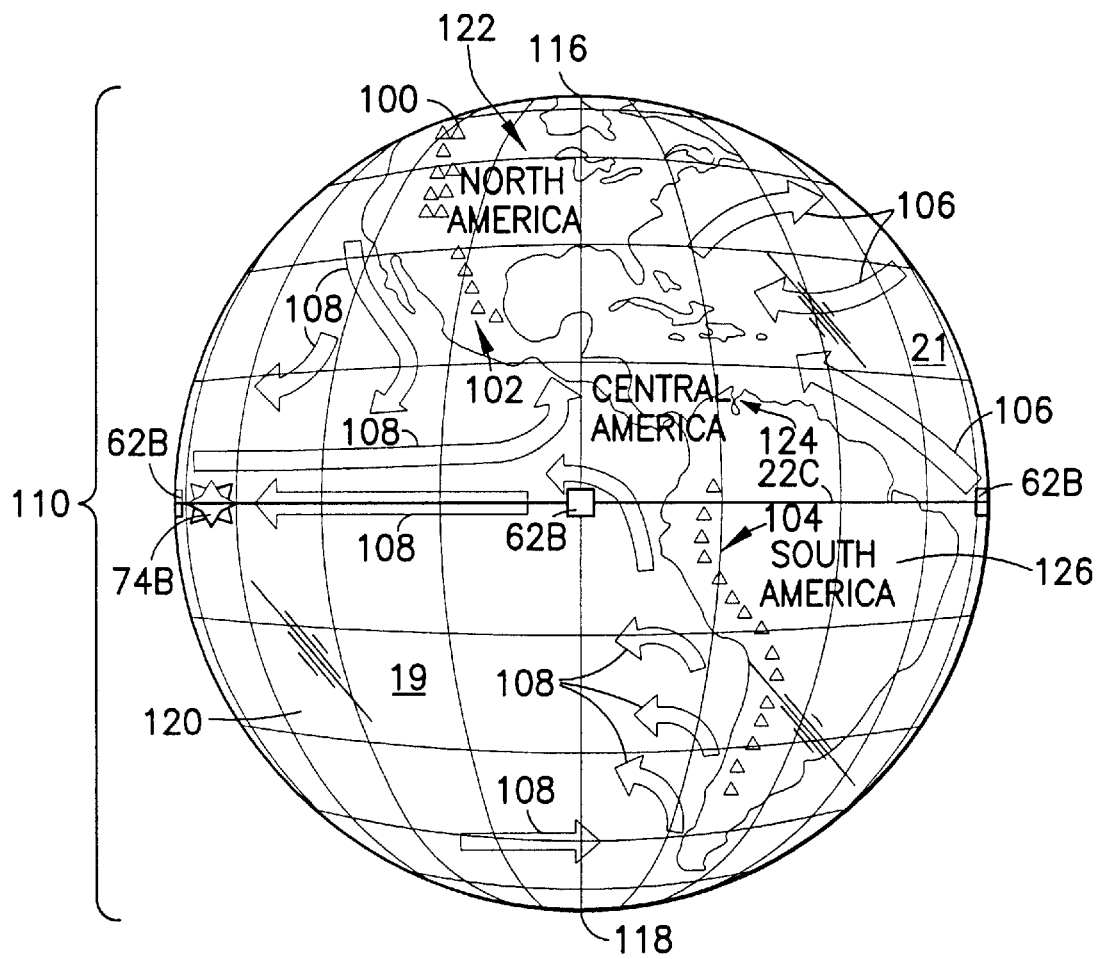
FIG. 12 is a perspective view taken through the plane of the equator of the earth together with the third film overlay of FIG. 11 mounted over the globular body of the earth and the first and second film overlays.

FIG. 12 shows third film overlay 110 fully positioned over globular body 12, first film overlay 42 and second film overlay 88. Globular body 12 with first film overlay 42, second film overlay 88, and third film overlay 110 can be mounted onto support structure 16 by axially sliding shaftway 32 downwardly onto shaft 30. As indicated in FIG. 12, an optional circular aperture 116 is defined in third film overlay 110 at axis 34 at north polar area 56 and another circular aperture 118 is defined in third film overlay 110 at axis 34 at south polar area 60. Third film overlay 110 includes a third spherical surface 120 that has imprinted thereon another feature related to the earth, namely, geographical indicia showing North America indicated as 122, Central America indicated as 124, and South America indicated as 126. It is to be understood that analogous indicia indicating other selected geographical areas are also imprinted on the eastern hemisphere on the opposite side of globular body 12 not viewed in FIGS. 9 and 10.

Figure 13:
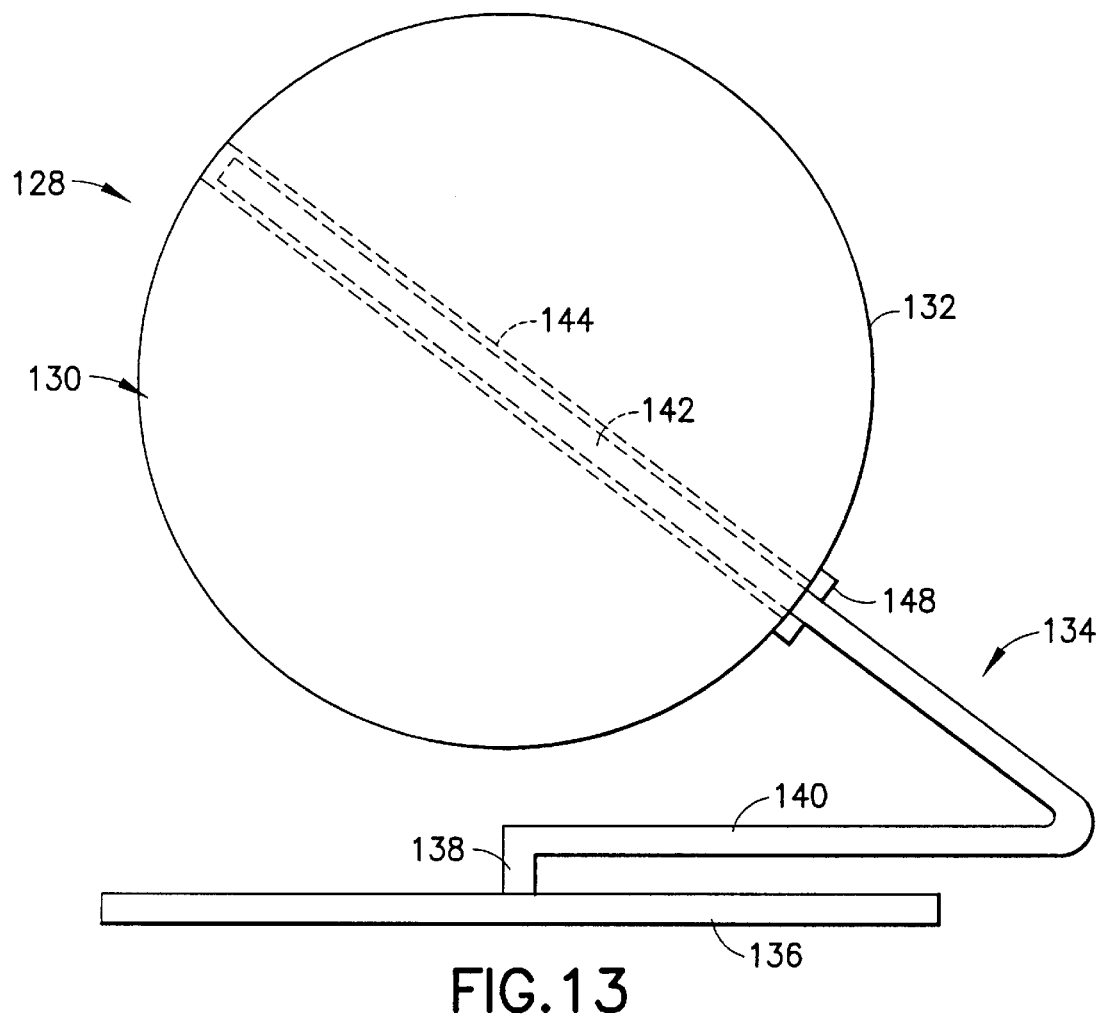
FIG. 13 shows an elevational view of a display globe including a globular body with a blank spherical surface mounted on a support.

As shown in FIG. 12, four snap-on connectors 62B comprising upper and lower connector portions 64B and 64B shown in FIG. 13 connect northern and southern hemisphere film overlays film 112 and 114, respectively, at 90 degree intervals around equator 22C. Snap-on connectors 62B are analogous to snap-on connectors 62 of first film overlay 42 shown in FIGS. 7, 8, and 8A. Northern and southern hemisphere film overlays 112 and 114 are placed into alignment at equator 22B by snap-on connectors 62B and an optional compass rose 74B shown in FIG. 12 comprising upper and lower halves 76B and 78B, respectively, of compass rose 74B as shown in FIG. 11.

Third film overlay 110, that is, both northern and southern hemisphere film overlays 112 and 114, is flexible so as to allow folding in the same manner as first film overlay 42 in FIG. 2 with a memory to re acquire a spherical configuration without folding creases when again placed in said successive mounted position. In addition, third film overlay 110 is biasable so as to allow stretching and having a biased mounted position of being fit snugly over one of or both first and second film overlays 42 and 88 and having an unbiased unmounted position removed from all film overlays. Third film overlay 110 can be directly and snugly mounted over globular body 12 in which case its biasable characteristic is not exercised.

First, second and third flexible film overlays 42, 88, and 110 are preferably made of a flexible, biasable plastic material such as a polyethylene plastic material manufactured by Dupont under the trade name Surlyn. The thickness of the plastic material is preferably defines a film with a thickness of 3 to 5 millimeters.

A display globe 128 shown in FIG. 13 includes a blank globular body 130 including a blank globe spherical surface 132 and a support structure 134 that mounts globular body 130. Globular body 130 is made of a hard plastic material that can be opaque or transparent.

Support structure 134 includes a base 136, a vertical post 138 secured to base 136, a horizontal support rod 140 connected at one end to the top of post 138 and integral at the other end of post 138 to a tilted shaft 142 that is slidably and rotatably positioned within a hollow, cylindrical shaftway 144 that is positioned within globular body 130. Shaftway 144 is unitary with and is internally affixed to globular body 130 and axially extends through globular body 130. The lower end of shaftway 144 rests upon a circular flange 148 unitary with shaft 142. Flange 148 in turn supports the entire globular body 130 in its mounted and angular disposition which gravitationally presses upon flange 148. Globular body 130 is rotatably mounted onto shaft 142 by way of shaftway 144 and is axially removable from support structure 134 by being slid upwardly from shaft 142, and furthermore in a similar manner is axially slidably mountable to shaft 142. The upward angle of shaft 142 relative to the horizontal allows for greater viewing of the earth as globular body 130 is rotated around shaft 142. The angle of shaft 142 relative to the horizontal can vary.

Figure 14:
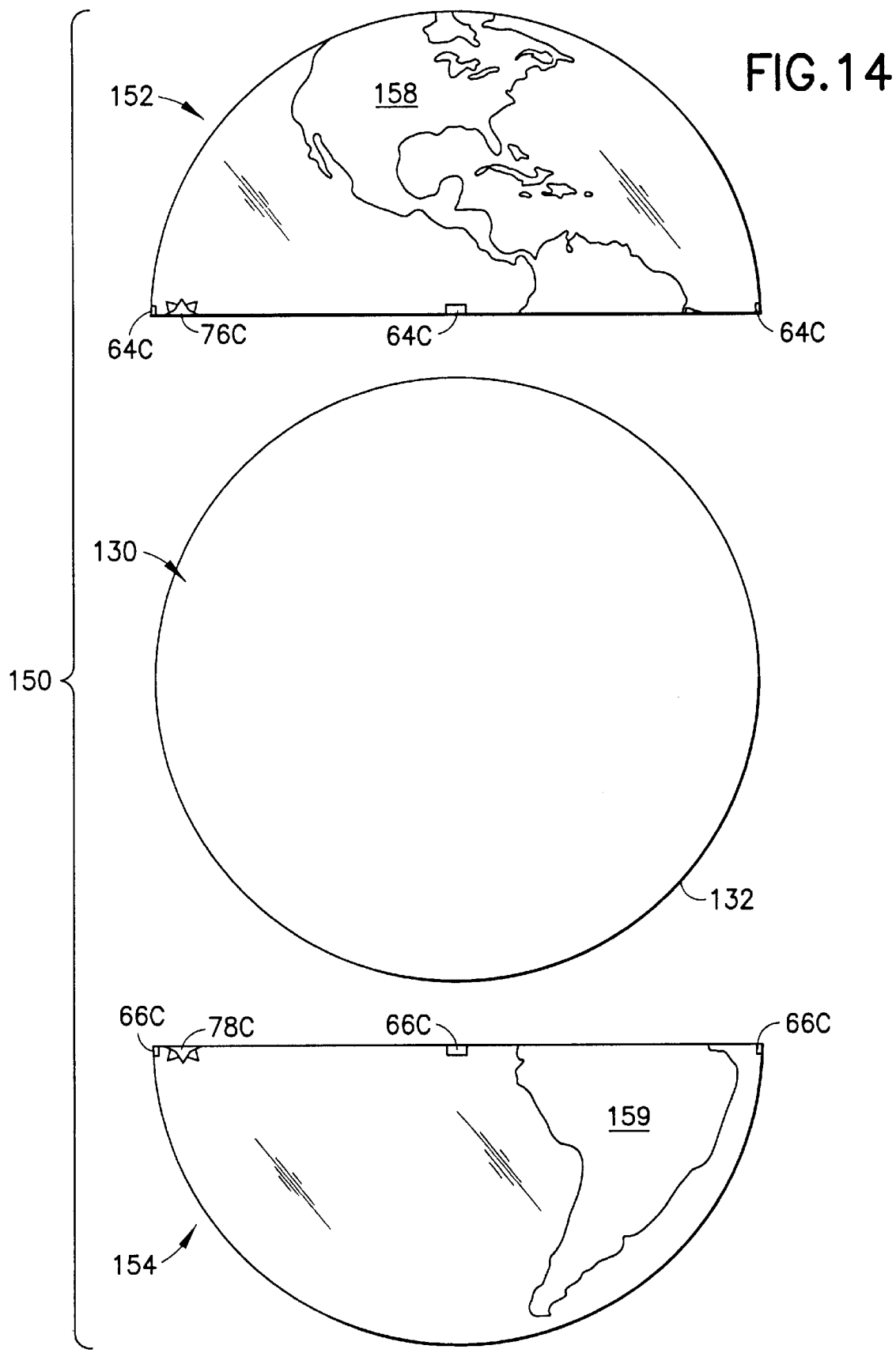
FIG. 14 is a perspective view of a rigid earth overlay comprising rigid northern and southern hemispheres of the earth with land formations imprinted thereon with the land formations of the western hemisphere of the earth in view in position for mounting over the blank globular body of FIG. 13.
Figure 15:
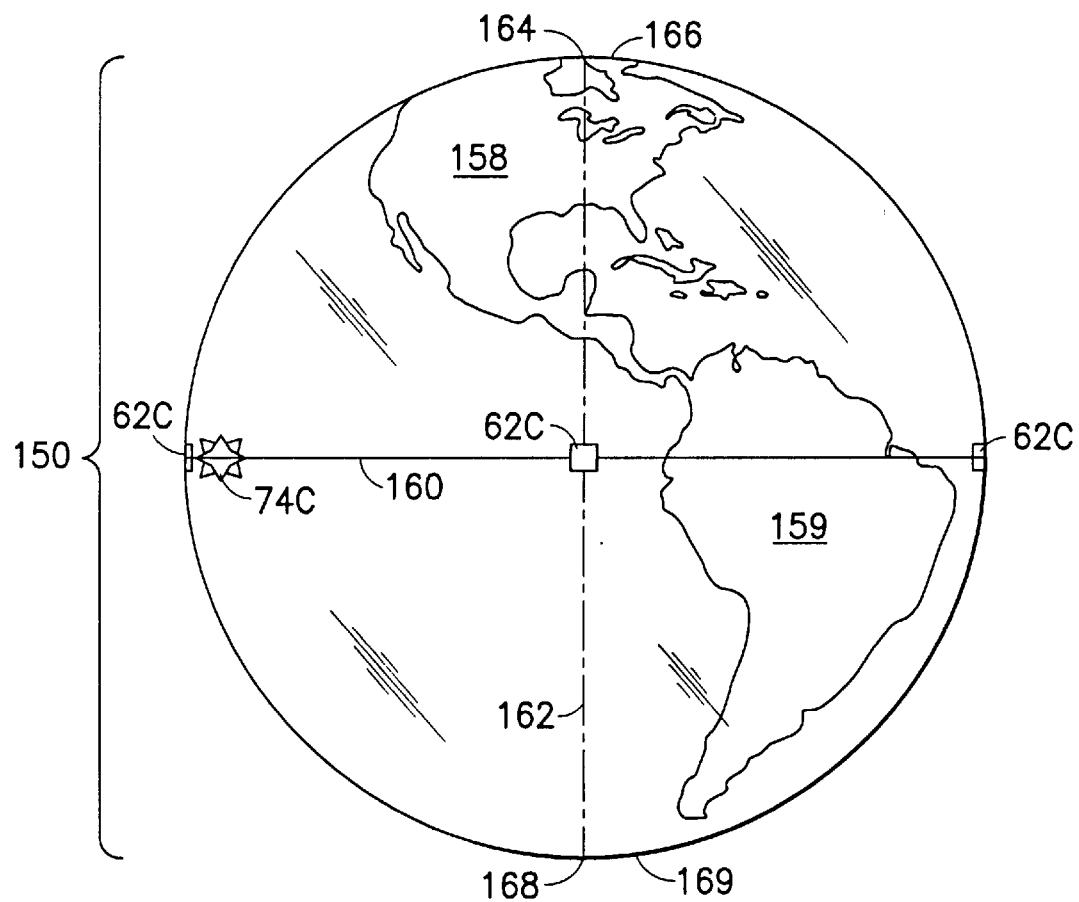
FIG. 15 is a perspective view taken through the equatorial plane of the earth of the rigid earth overlay of FIG. 14 mounted over the blank globular body of FIGS. 13 and 14.

A rigid spherical overlay 150 comprising two hemispheres, namely, a northern hemisphere rigid overlay 152 and a southern hemisphere rigid overlay 154 together having a rigid spherical surface 156 is shown in FIGS. 14 and 15. In FIG. 14, northern and southern hemisphere rigid overlays 152 and 154 are separated and in position for being mounted over globular body 130, which has been removed from support structure 134, particularly from shaft 142. In FIG. 15, northern and southern hemisphere rigid overlays 152 and 154 are fully mounted over blank globular body 130. Northern hemisphere rigid overlay 152 and southern hemisphere rigid overlay 154 have imprinted on rigid spherical surface 156 selected features related to the earth shown in FIGS. 14 and 15 as selected major land formations shown for purposes of exposition as North America 158 and as South America 159 of the western hemisphere with the eastern hemisphere being out of view. The earth axis 162 is shown in FIG. 15 in phantom line which is coextensive with shaft 142 and shaftway 144 of FIG. 13. FIG. 15 shows northern and southern hemisphere rigid overlays 152 and 154 fully positioned over globular body 130 and forming rigid spherical overlay 150. The perspective view of FIG. 15 is taken through the plane of equator 160 of the earth.

Rigid spherical overlay 150 has a spherical dimension that allows a snug fit in the mounted position over globular body 130 and further has an unmounted position of having been removed from globular body 130. In the unmounted position northern and southern hemisphere overlays 152 and 154 can be nested in a stored mode. Rigid spherical overlay 150 as comprising northern hemisphere rigid overlay 152 and southern hemisphere rigid overlay 154 is made of a rigid plastic material that is either opaque or transparent or translucent.

After rigid spherical overlay 150 has been fully and snugly positioned over globular body 130, both globular body 130 with rigid spherical overlay 150 is mounted to support structure 134 by axially sliding shaftway 144 around shaft 142. As shown in FIGS. 14 and 15, an optional circular aperture 164 is defined in rigid spherical overlay 150 at north polar area 166, and a circular aperture 168 is defined in rigid spherical overlay 150 at earth axis 162 at south polar area 169.

Southern hemisphere rigid overlay 154 is removably secured to northern hemisphere rigid overlay 152 by four snap-on connectors 62C spaced at 90 degree intervals positioned around equator 160 as shown in FIG. 15 comprising upper and lower connectors 64C and 66C, respectively, shown in FIG. 14. Snap-on connectors 62C are analogous to snap-on connectors 62 as set forth in and described relative to FIGS. 7, 8, and 8A. Alignment between northern and southern hemisphere rigid overlays 152 and 154 is made by snap-on connectors 62C and by an optional compass rose 74C shown in FIG. 15 that comprises upper and lower halves 76C and 78C of compass rose 74C as shown in FIG. 14.

Figure 16:
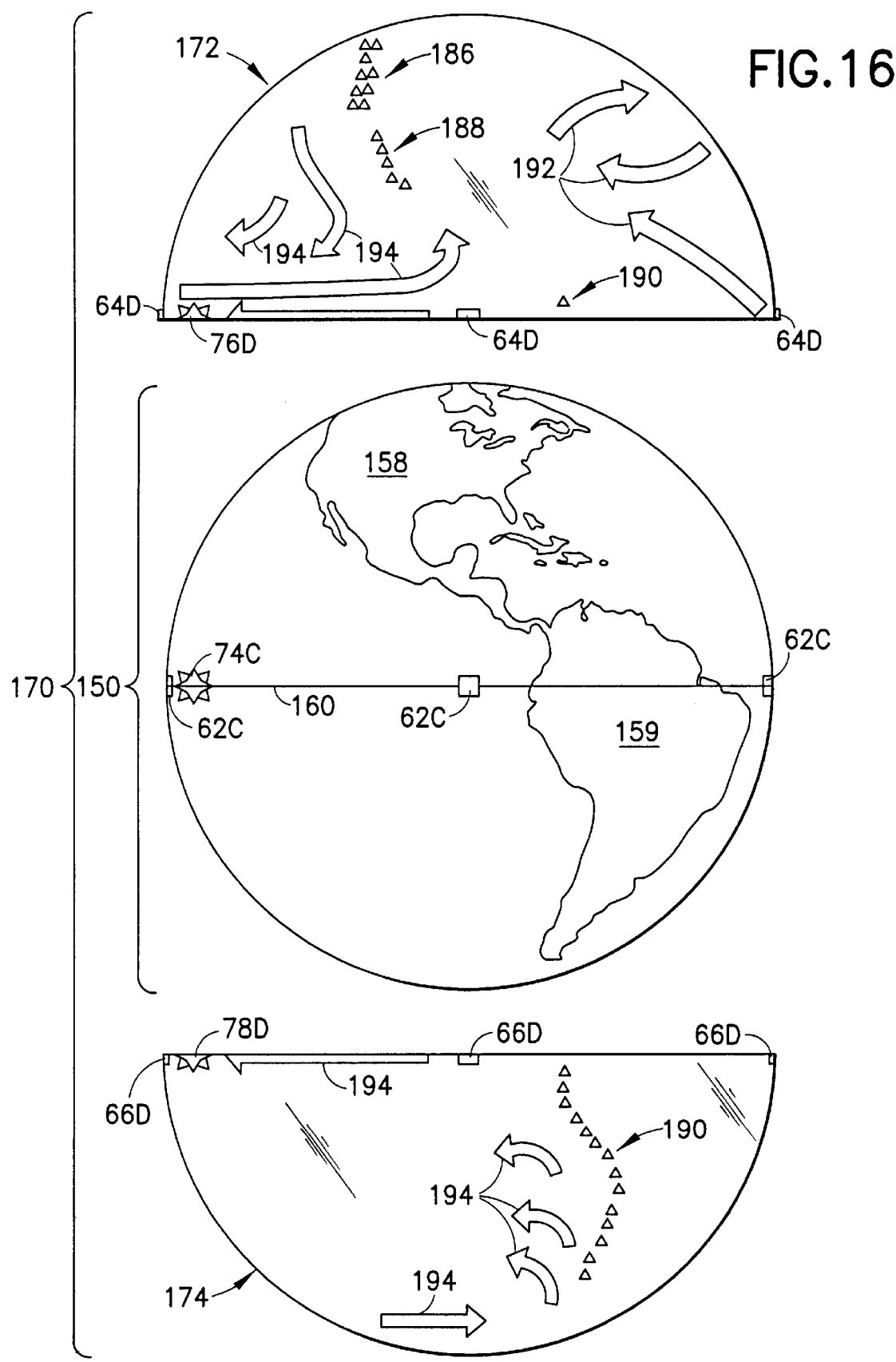
FIG. 16 is a perspective view of a flexible transparent film overlay comprising the northern and southern hemispheres of the earth with topographic features imprinted thereon in position for mounting over the blank globular body and the rigid overlay of the earth as shown in FIG. 15.

FIG. 16 shows globular body 130 along with rigid spherical overlay 150 having been removed from support structure 134 by sliding shaftway 144 upwards from shaft 142. A transparent spherical film overlay 170 is positioned for being slidably mounted over both globular body 130 and rigid spherical overlay 150. Film overlay 170 comprises two hemispheres, namely, a northern hemisphere film overlay 172 and a southern hemisphere overlay film 174. In particular northern hemisphere film overlay 172 is shown positioned for mounting over northern hemisphere rigid overlay 152 of globular body 130 and southern hemisphere film overlay 174 is shown positioned for mounting over southern hemisphere rigid overlay 154 of globular body 130.

Figure 17:
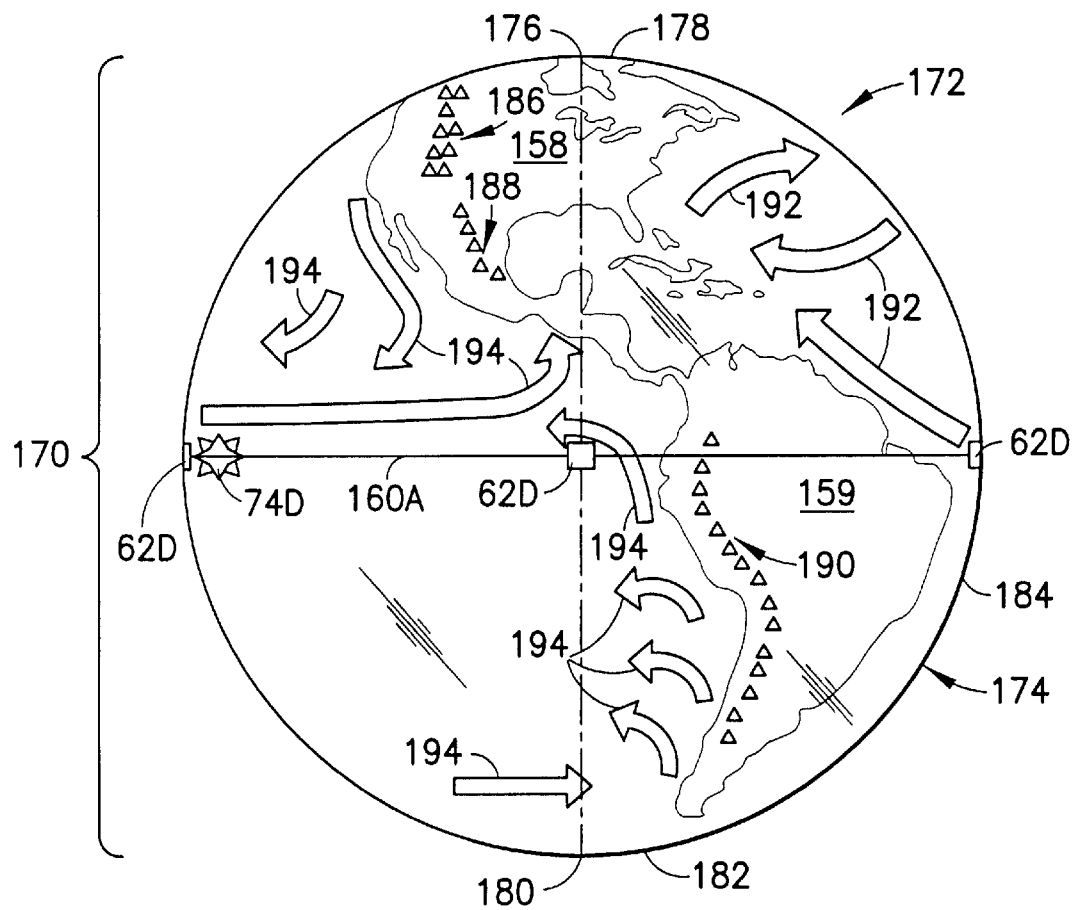
FIG. 17 is a perspective view taken through the equatorial plane of the earth of the flexible transparent film overlay mounted over the blank globular body with the rigid overlay of the earth shown in FIG. 16.
Figure 18:
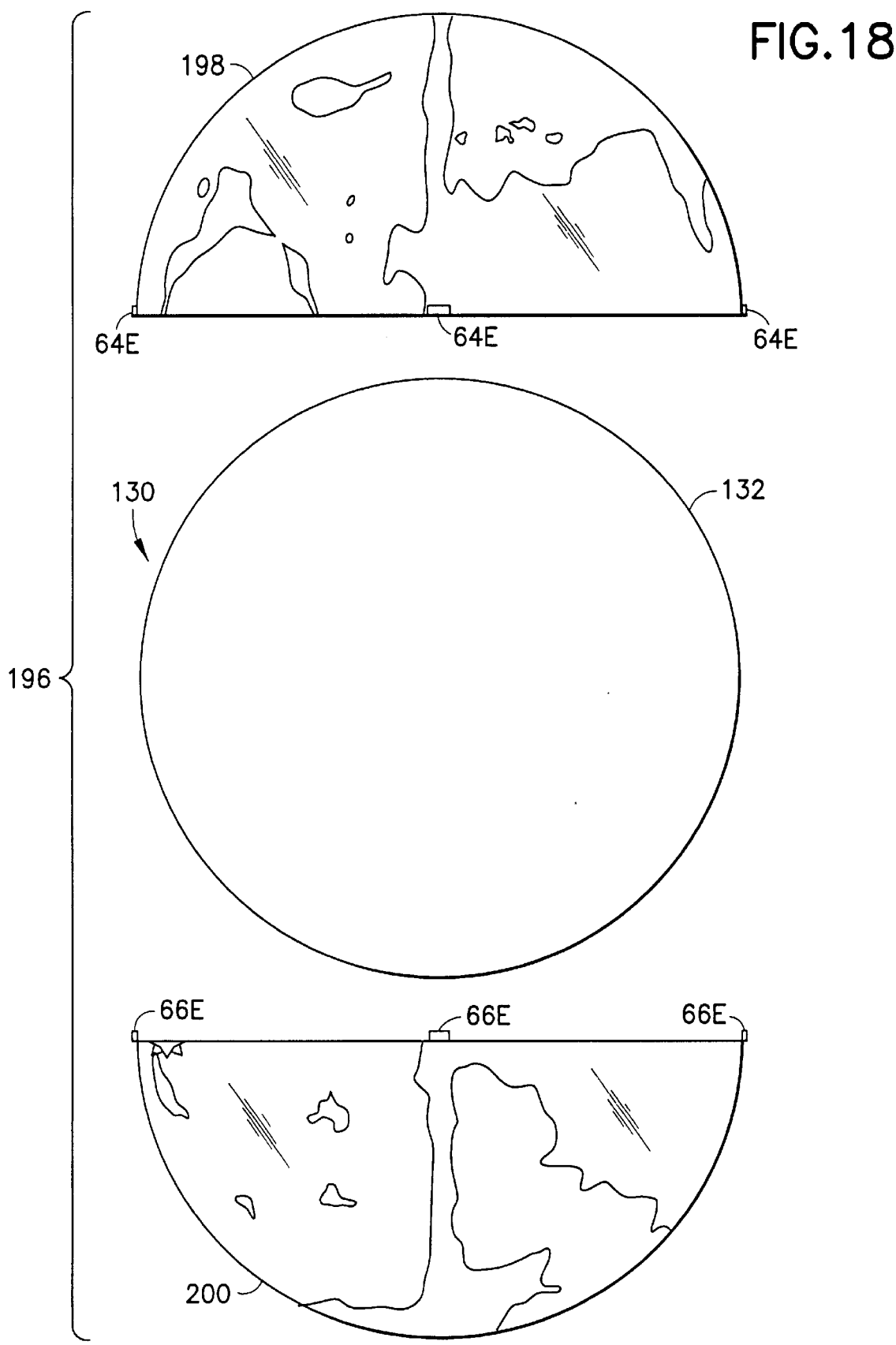
FIG. 18 is a perspective view of a pair of rigid hemispheric overlays together representing the front hemisphere of the moon in position for mounting over the blank globular body of FIG. 11.

FIG. 17 shows film overlay 170 fully positioned over globular body 130. Globular body 130 with film overlay 170 can be mounted onto support structure 134 by axially sliding shaftway 144 downwardly onto shaft 142. As indicated in FIGS. 16 and 17, an optional circular aperture 176 is defined in film overlay 170 at earth axis 162 at north polar area 178 and another circular aperture 180 is defined film overlay 170 at earth axis 162 at south polar area 182. Film overlay 170 includes a film spherical surface 184 that has imprinted thereon another feature related to the earth, namely, a selected geographical feature herein being the mountain ranges of North America and South America shown without being particularly designated but known as the Rocky Mountains of North America indicated as 186, the Sierra Madre Occidental mountain range of Mexico indicated as 188, and the Andes mountain system of South America indicated as 190. Other major mountain ranges of the eastern hemisphere out of the view shown in FIG. 18 would likewise be imprinted on film spherical surface 184. A second feature imprinted on film spherical surface 184 is ocean currents particularly shown as Atlantic Ocean currents 192 and Pacific Ocean currents 194. Although not particularly shown, it is to be understood that the other major ocean currents of the earth of the eastern hemisphere out of the view shown in FIG. 18 are also be imprinted on film spherical surface 184.

Film overlay 170 comprising northern and southern hemisphere film overlays 172 and 174 is flexible so as to allow folding in the same manner as first film overlay 42 in FIG. 2 with a memory to re acquire a spherical configuration without folding creases when again placed in said successive mounted position. In addition, film overlay 170 is biasable so as to allow stretching over rigid spherical overlay 150 and having a biased overlay mounted position of being fit snugly over rigid spherical overlay 150 and having an unbiased unmounted position removed from rigid spherical overlay 150.

Southern hemisphere film overlay 174 is removably secured to northern hemisphere film overlay 172 by four snap-on connectors 62D spaced at 90 degree intervals positioned around equator 160A as shown in FIG. 17 with upper and lower connectors 64D and 64D, respectively, that are secured to northern and southern hemisphere film overlays 172 and 174, respectively, shown in FIG. 16. Snap-on connectors 62D shown in FIG. 17 that comprises upper and lower halves 64D and 66D shown in FIG. 16 are analogous to snap-on connectors 62 as set forth in and described relative to FIGS. 7, 8, and 8A. Alignment between northern and southern hemisphere film overlays 172 and 174 is made by snap-on connectors 62D and by an optional compass rose 74D that comprises upper and lower compass rose halves 76D and 78D shown in FIG. 16 analogous to compass rose 74 shown in FIGS. 7, 8, and 8A.

Figure 19:
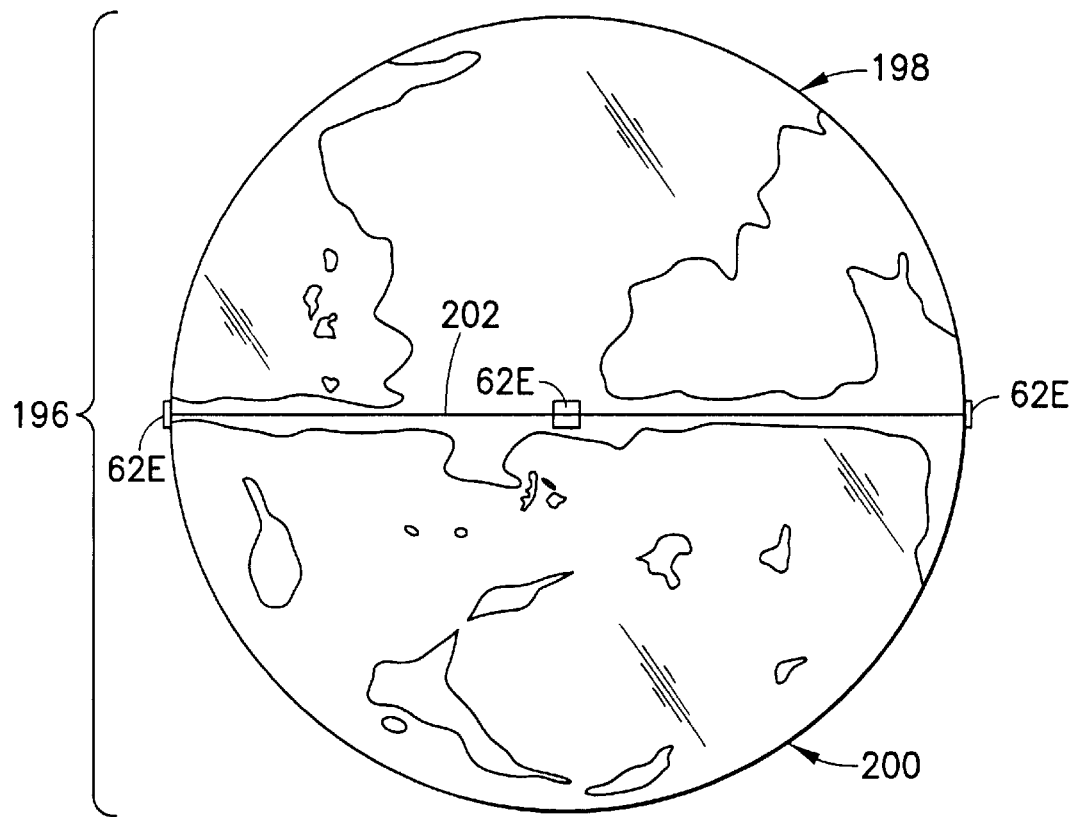
FIG. 19 is a perspective view of the pair of rigid hemispheric overlays shown in FIG. 18 representing the front hemisphere of the moon fully mounted over the blank globular body of FIG. 16.
Figure 20:
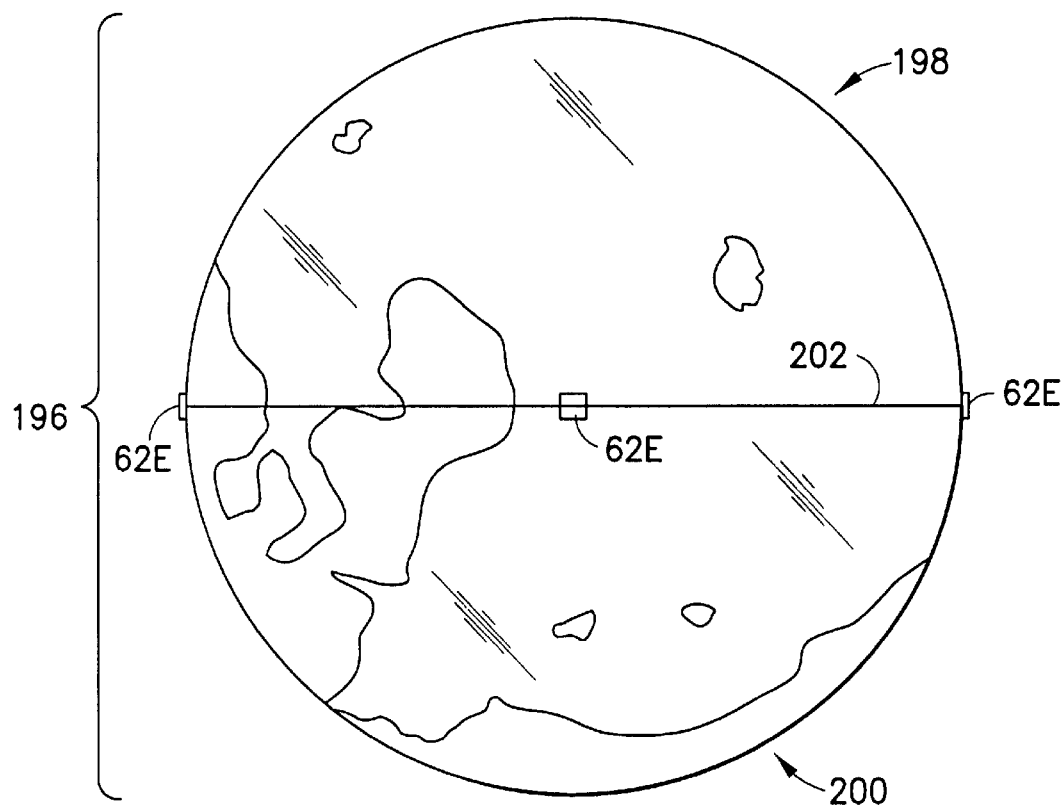
FIG. 20 is a perspective view of the same pair of hemispheric overlays shown in FIGS. 18 and 19 but representing the rear hemisphere of the moon fully mounted as shown in FIG. 19 over the blank globular body of FIG. 16.

Representations of the planets of the solar system can be shown. FIGS. 18, 19, and 20 show the moon as an expository example of representation of any of the planets of the solar system. FIG. 18 shows globular body 130 having been removed from support structure 134 by sliding shaftway 144 upwards from shaft 142. A moon overlay 196 comprising a pair of hemispheric portions 198 and 200 representing the front hemispheric face of the moon as seen from earth are shown in FIG. 18 in position for mounting over globular body 130. Randomly selected hemispheric portion overlays 198 and 200 are shown by way of example as any pair of hemispheric portions of the moon. FIG. 19 shows moon hemispheric portion overlays 198 and 200 fully mounted over globular body 130 as moon overlay 196 representing the front hemispheric face of the moon as seen from the earth. FIG. 20 shows moon overlay 196 as shown in FIG. 19 but being the hemispheric rear of the moon not seen from the earth but as recreated by photographs taken from space vehicles. It is to be understood that in FIGS. 19 and 20 the moon is represented as is known with the light portions being generally representative of the flatter portions of the moon as light reflective and the darker portions of being generally representative of the more irregular and mountainous portions of the moon as light absorptive. Such representations of the moon in FIGS. 18, 19, and 20 are understood to be merely generally representative for purposes of exposition and in addition moon overlay 196 is more generally expository of any planetary object that can be recreated from space photographs.

Moon hemisphere portion overlay 198 is removably secured to moon hemisphere overlay 200 by four snap-on connectors 62E spaced at 90 degree intervals secured around the joint circular edges 202 of moon hemispheric portions 198 and 200 as shown in FIGS. 19 and 20 with upper and lower connectors 64E and 66E, respectively, shown in FIG. 18. Snap-on connectors 62E are analogous to snap-on connectors 62 as set forth in and described relative to FIGS. 7, 8, and 8A. Alignment between northern and southern hemispheric portion overlays 198 and 200 is made in accordance with snap-on connectors 62E.

Moon film overlay 196 when mounted over blank globular body 130 can be opaque or transparent and in either case can be optionally translucent. Moon film overlay 196 can be either a thin film overlay such as first film overlay 42 described in relation to FIGS. 2 and 3 or be as rigid spherical overlay 150 described in relation to FIGS. 14 and 15.

Figure 21:
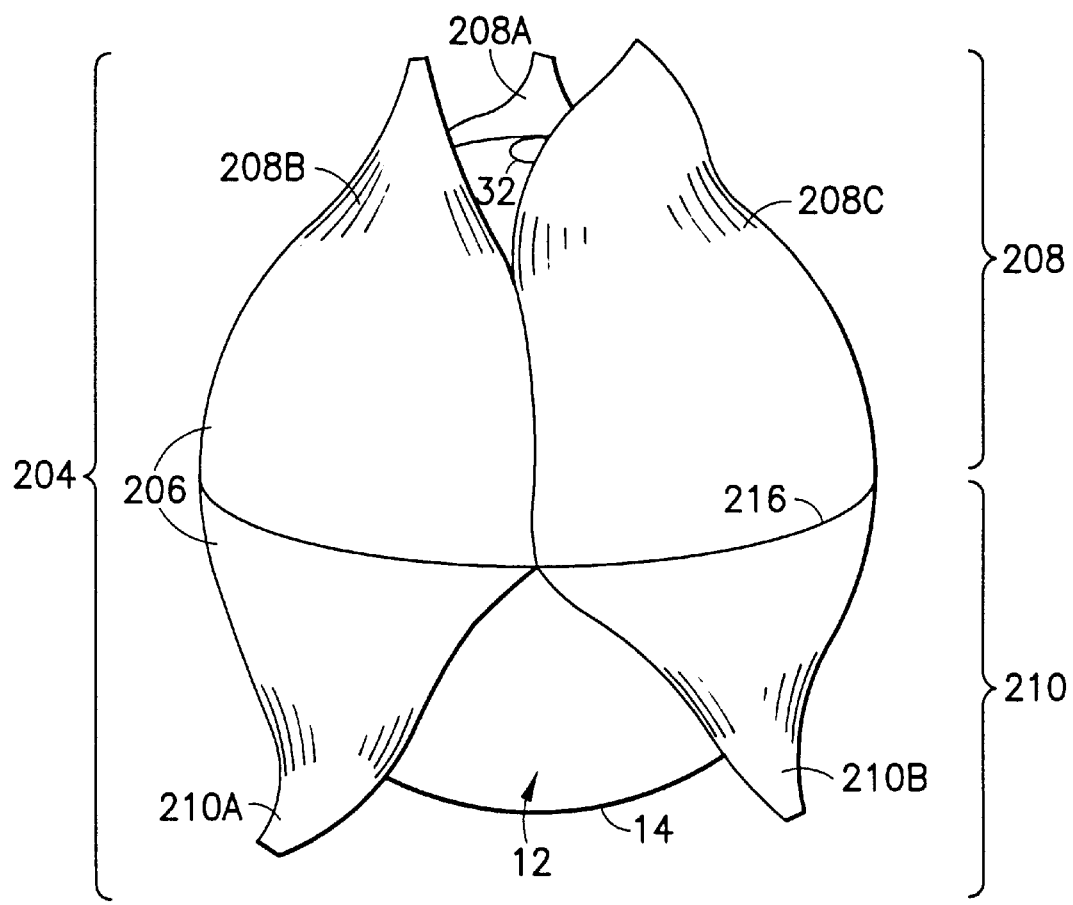
FIG. 21 is a perspective view of the blank globular body shown in FIG. 13 taken in isolation with blank triangular strip film overlays partly mounted thereon and partly peeled away from the globular body.
Figure 22:
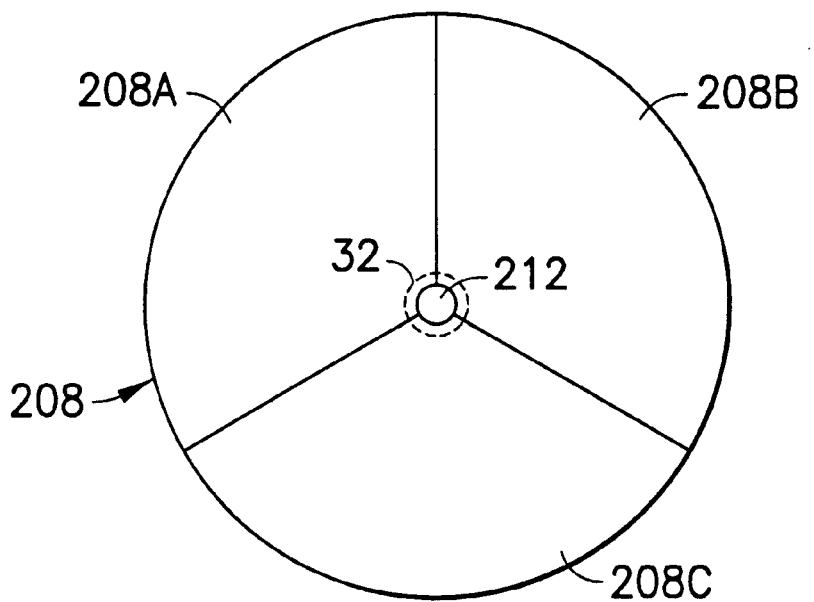
FIG. 22 is a view taken perendicular to the shaft of the globular body shown in FIG. 21 with one set of three triangular film strips shown in FIG. 21 fully positioned over the globular body.
Figure 23:
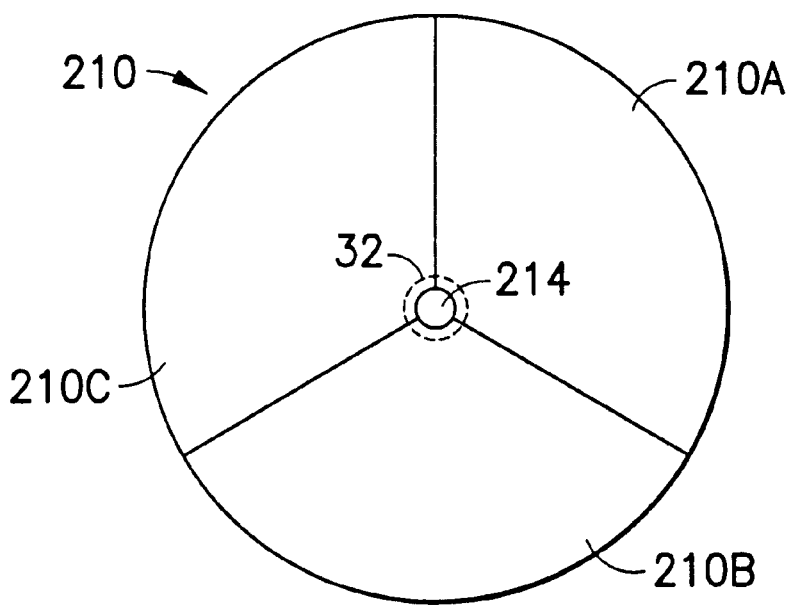
FIG. 23 is a view taken perpendicular to the opposite end of the shaft of the globular body shown in FIG. 22 with the other set of three triangualar film strips shown in FIG. 21 fully positioned over the globular body.

FIGS. 21, 22, and 23 show an alternative six-triangular-strip film spherical overlay 204 that has a configuration that can be placed over globular body 12 shown in FIG. 1. Except for six-triangular-strip film spherical overlay 204 globular body 12 is shown in isolation having been removed from support structure 16. Spherical film overlay 204 is shown with a blank surface 206, but it is to be understood that the blank surface 206 can have imprinted thereon any selected earth feature in the same manner as globular body 12 of display globe 10 shown in FIG. 1. Six-triangular-strip film spherical overlay 204 is a flexible film that comprises an upper hemisphere film overlay 208 and a lower hemisphere film overlay 210 shown in FIGS. 21, 22, and 23. Upper hemisphere film overlay 204 comprises three equal-sized triangular film strips 208A, 208B, and 208C, each shown in FIG. 21 in a partially peeled back view, partially mounted to and partly peeled from globular body 12. Triangular film strips 208A, 208B, and 208C are also shown in a top view in FIG. 22 fully mounted over globular body 12 and in alignment at their triangular apexes at shaftway 144 of globular body 130. Similarly, lower hemisphere film overlay 210 comprises three equal-sized triangular film strips 210A, 210B, and 210C shown in a bottom view fully mounted over globular body 12 in alignment at their triangular apexes at shaftway 144 diametrically opposed to the alignment of the apexes of three triangular film strips 208A, 208B, and 208C at the opposed end of shaftway 32. Triangular film strips 210A and 210B are shown in FIG. 21 partly peeled away from and partly mounted to globular body 12 with the triangular film strip 210C hidden from view. Each triangular film strip 208A, 208B, 208C and 210A, 210B, and 210C have arced bases that are respectively adjacent to one another coextensive with the equator 216 of the earth shown in FIG. 21 and meet to form a circle that overlies equator 22 of globular body 12 shown in FIG. 1.

An optional circular aperture 212 is defined in six-strip film overlay 204 at the aligned apexes of triangular film-strips 208A, 208B, and 208C, and a circular aperture 214 is defined in six-strip film overlay 204 at the aligned apexes of triangular film strips 210A, 210B, and 210C.

Six-triangular-strip film spherical overlay 204 is held in position against globe spherical surface 14 of globular body 12, and by analogy against globe spherical surface 14 of globular body 12 shown in FIG. 1, by an electromagnetic charge induced in globular body 12 or in six-triangular-strip film overlay 204.

Although the present invention has been described in some detail by way of illustration and example for purposes of clarity and understanding, it will, of course, be understood that various changes and modifications may be made in the form, details, and arrangements of the parts without departing from the scope of the invention. As for example, a plurality of connectors, such as four snap-on connectors 62, 62A, 62B, 62C, 62D, and 62E have been described in general in relation to the embodiments shown FIGS. 4 and 5; FIGS. 9 and 10; FIGS. 11 and 12; FIGS. 14 and 15; FIGS. 16 and 17; and FIGS. 18 and 19, respectively, with particular reference of each to a particular embodiment of a suitable type of connector set forth in detail in FIGS. 7, 8, and 8A. Other suitable connectors, for example, a plurality of conventional male-female "plug-in" type puzzle-type connectors (not shown) may also be used the joint connection between the hemispherical overlays. Other suitable connecting means may comprise magnetic type or zip-lock type connectors.

What is claimed is:

1. A multidisplay globe, comprising, a globular body including a globe spherical surface, support means for mounting said globular body, spherical overlay means removably mounted over said globe spherical surface for displaying selected features related to said globular body, said spherical overlay means including a plurality of transparent flexible biasable film overlays each being removably successively mountable over the other in a successive mounted position and each having an unmounted position with a memory to reacquire a spherical configuration when again placed in said successive mounted position, wherein each of said plurality of transparent flexible biasable film overlays comprises two removably connected hemisphere portions, each said biasable film overlay having a biased overlay position of being fit snugly over another film overlay and an unbiased unmounted position removed from said another film overlay, said globular body representing the earth and each of said plurality of transparent flexible biasable film overlays comprising said two hemisphere portions, wherein said selected features relate to the earth, said two hemisphere portions representing the north and south hemispheres of the earth and having a circular common juncture that is coextensive with the representation of the equator of the earth, and a connecting mechanism removably gripping said two hemisphere portions along said circular common juncture.

2. The multidisplay globe according to claim 1, wherein said connecting mechanism includes a plurality of snap-on connectors.

3. The multidisplay globe according to claim 1, further including means for aligning said north and south hemispheres mounted as an overlay over said globe spherical surface.

4. The multidisplay globe according to claim 3, wherein said means for aligning being a compass rose comprising compass rose half-portions on each of said hemisphere portions at said equator.

5. The multidisplay globe according to claim 4, wherein each of said transparent flexible biasable film overlay is a transparent flexible biasable plastic material.

6. The multidisplay globe according to claim 5, wherein said flexible biasable plastic material is polyethylene.

7. The multidisplay globe according to claim 5, wherein said transparent flexible biasable plastic material is Surlyn.

8. The multidisplay globe according to claim 5, wherein said transparent flexible biasable plastic material defines a film overlay in a range of 3 to 5 millimeters in thickness.

9. The multidisplay globe according to claim 1, wherein said selected features relating to the earth include selected geopolitical divisions of the earth.

10. The multidisplay globe according to claim 1, wherein said selected features relating to the earth include selected historical developments.

11. The multidisplay globe according to claim 1, wherein said selected features relating to the earth include selected biological features including fauna, flora and marine life.

12. The multidisplay globe according to claim 1, wherein said selected features related to the earth include climatic conditions past and present.

13. The multidisplay globe according to claim 1, wherein said globular body includes metallic means for holding a movable magnetized marker against said spherical earth surface.

14. The multidisplay globe according to claim 1, wherein said globe spherical surface is a blank globe spherical surface.

15. The multidisplay globe according to claim 5, wherein said transparent flexible biasable material includes a write-on/wipe-off surface.

16. The multidisplay globe according to claim 1, wherein said selected features relating to the earth include selected major land formations.

* * * * *